United States Patent [19]

Bapat

[11] Patent Number: 5,291,583

[45] Date of Patent: Mar. 1, 1994

[54] AUTOMATIC STORAGE OF PERSISTENT ASN.1 OBJECTS IN A RELATIONAL SCHEMA

[75] Inventor: Subodh Bapat, Fort Lauderdale, Fla.

[73] Assignee: Racal-Datacom, Inc., Sunrise, Fla.

[21] Appl. No.: 628,120

[22] Filed: Dec. 14, 1990

[51] Int. Cl.⁵ .............................................. G06F 15/40
[52] U.S. Cl. ..................... 395/500; 395/600;
       364/280.4; 364/283.2; 364/283.4; 364/DIG. 1
[58] Field of Search ................. 395/600, 500

[56] References Cited

U.S. PATENT DOCUMENTS

| | | | |
|---|---|---|---|
| 4,805,099 | 2/1989 | Huber | 395/600 |
| 4,918,593 | 4/1990 | Huber | 395/600 |
| 4,924,408 | 5/1990 | Highland | 395/500 |
| 4,930,071 | 5/1990 | Tou et al. | 364/300 |
| 4,949,253 | 8/1990 | Chigira et al. | 395/500 |
| 4,994,948 | 2/1991 | Anezaki | 364/419 |
| 5,121,494 | 6/1992 | Dias et al. | 395/600 |
| 5,133,075 | 7/1992 | Risch | 395/800 |
| 5,161,225 | 11/1992 | Abraham et al. | 395/600 |
| 5,181,162 | 1/1993 | Smith et al. | 364/419 |
| 5,201,046 | 4/1993 | Goldberg et al. | 395/600 |

OTHER PUBLICATIONS

"An Object-Oriented Relational Database", Premenain et al Communications of the ACM, Nov. 1990, vol. 33, No. 11, pp. 99-109.

*Primary Examiner*—Parshotam S. Lall
*Assistant Examiner*—Viet Vu
*Attorney, Agent, or Firm*—William A. Newton

[57] ABSTRACT

A translator for translating objects defined in Abstract Syntax Notation such as ASN.1 to a relational database schema permits persistent storage of object instances as records in a relational database. Object classes are mapped to entity tables with object instances represented by entity records. Simple attributes are mapped to primitive typed attribute columns and package or group attributes are mapped to separate dependent entity tables. Derived attributes are represented by joins of the parent and child entity records.

34 Claims, 23 Drawing Sheets

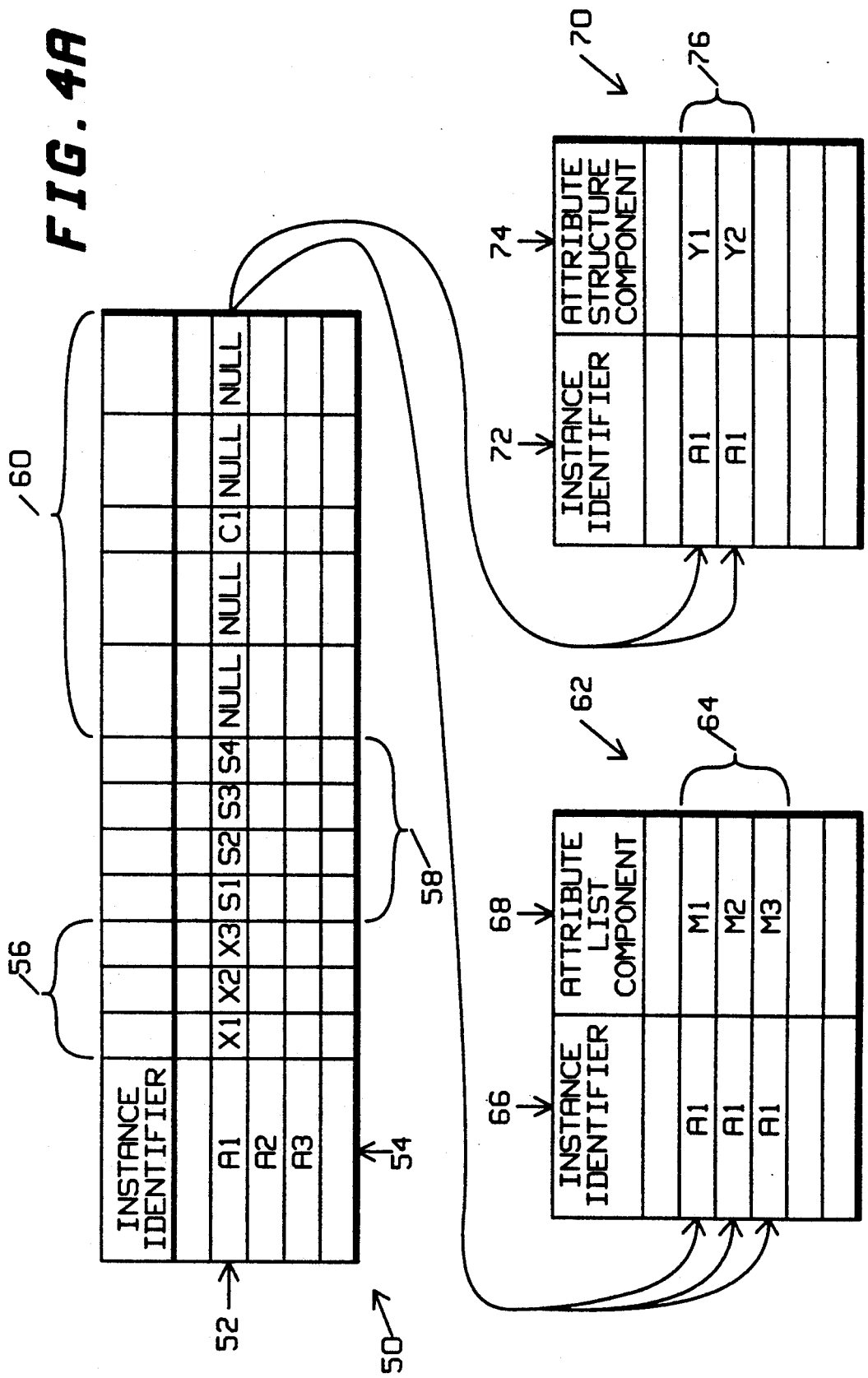

AUTOMATIC STORAGE OF PERSISTENT ASN.1 OBJECTS IN A RELATIONAL SCHEMA

CROSS REFERENCE TO RELATED APPLICATIONS

This invention is related to a co-pending application Ser. No. 09/628,258, filed Dec. 14, 1990 entitled "Automatic Storage of Persistent Objects in a Relational Schema" invented by the inventor of the present invention and filed simultaneously herewith. This co-pending application is hereby incorporated by reference.

BACKGROUND

1. Field of the Invention

This invention relates generally to a technique for storing object instances described in an abstract syntax in a relational database schema. In particular, the present invention describes a method and apparatus for storing ASN.1 (see definition below) object instances in a relational database using a language such as SQL (Structured Query Language), although the present invention should not be limited to these particular languages.

2. Background of the Invention

With the advent of OSI standard descriptions of object representations in abstract syntax, it becomes desirable or necessary to store these objects in some form of persistent storage. Current OSI standards (ASN.1 and ASN.1 Basic Encoding Rules) define only how an object representation is laid out within a protocol data stream. However, to store a persistent representation of objects, there is no definition for a storage format. Although object-oriented databases seek to achieve this function, they are not a mature technology at the time of this writing, and are not expected to reach this stage for some time to come.

Relational database products, on the other hand, represent a mature technology. As standard object definition languages (such as ASN.1) gain rapid acceptance for application development, there will be a demand for techniques to store persistent object definitions within the schema of a relational database management system. The current invention addresses this need. It provides a technique for the easy storage of persistent representations of objects defined in source constructs of an abstract syntax, within the schema of a relational database.

The technique will be illustrated in the examples with source constructs in ASN.1 interfaced with relational database requests issued in standard SQL. However, this is not restrictive, as this technique can be used with any abstract syntax using object-oriented macro notation with any relational database.

The following sections describe how such translation could be implemented using a programmed computer. For purposes of this discussion, this programmed computer will be referred to with the tentative name "MIB Schema Compiler" (i.e. A compiler for an Abstract Syntax Notation definition for a Management Information Base, which generates a corresponding database schema definition in, for example, SQL).

All examples in this discussion are from the realm of object modeling in a communications network. With the exception of occasional simplifications for conceptual clarity, all examples conform to object modeling guidelines proposed by various standards bodies. A basic familiarity with object-oriented modeling is assumed.

DEFINITION OF TERMS

Several of the terms used herein, while commonplace in relational database management environments or object oriented programming or ASN.1 environments, may not be generally understood. General definitions of these terms are provided below. While it is not intended that the present invention be restricted by shortcomings in these definitions, it is believed helpful to provide these definitions as guidance to those unfamiliar with the terms. Those skilled in the art will understand that the present invention should only be limited by the conventionally understood meaning of these terms.

object—A real physical or abstract logical entity useful for a given application (e.g. "person").

instance—A specific realization of an object (e.g. "Groucho Marx").

object class—A template specifying the abstraction for a given set of objects having characteristics in common.

class construct or class macro—The representation of the template within the syntax of a programming language.

inheritance—The classification of classes themselves, allowing classes to be organized in a hierarchy from the most abstract to the most specific, such that the lower classes are specializations of the upper classes, possessing all of the attributes of the upper classes and defining some of their own.

relationship—The superclass/subclass relationship (also called a parent class/derived class relationship) along an inheritance hierarchy.

schema—The logical organization of the data structures within a database.

ASN.1—Abstract Syntax Notation One, an OSI and CCITT standard (ISO 8824 and CCITT X.208) for describing the structure and contents of information objects in a formal notation.

ASN.1 macro—A facility provided in ASN.1 to extend the syntax of the notation for customization to particular applications.

SUMMARY OF THE INVENTION

It is an object of the present invention to provide a method for representing ASN.1 object representations in a relational table schema.

It is another object to provide a technique which permits storage of ASN.1 objects in a persistent storage media.

It is an advantage that the SQL relational database management systems can be used to store and manipulate the ASN.1 representations.

These and other objects, advantages and features of the invention will become apparent to those skilled in the art upon consideration of the following description of the invention.

In one aspect of the present invention, a translator for translating objects defined in Abstract Syntax Notation such as ASN.1 to a relational database schema permits persistent storage of object instances as records in a relational database. Object classes are mapped to entity tables with object instances represented by entity records. Simple attributes are mapped to primitive typed attribute columns and package or group attributes are mapped to separate dependent entity tables. Derived attributes are represented by joins of the parent and child entity records.

In another aspect of the present invention, an apparatus for translating information represented as an Abstract Syntax Notation object-class hierarchy into a relational table schema includes a central processor and computer memory operatively coupled to the central processor for temporary storage of information. Persistent storage, operatively coupled to the central processor stores information in a persistent manner. An Abstract Syntax Notation file stored in the computer memory represents data in an Abstract Syntax Notation object class hierarchy. A MIB Schema Compiler is stored in the computer memory, for translating the data represented in the Abstract Syntax Notation object class hierarchy into a relational table schema.

A method, according to the present invention, for a computer to translate an Abstract Syntax Notation object class hierarchy into a relational schema includes the steps of: providing an Abstract Syntax Notation class hierarchy of object-oriented information comprising at least one parent class having a first attribute and one derived class having a second attribute, the derived class inheriting the first attribute from the parent class; defining a first table structure, corresponding to the parent class, including a first table name, the first table structure including: a first instance identifier field for storing a first instance identifier which identifies a particular instance of the derived class, and a first field for storing instances of the first attribute, the first instance identifier field and the first field comprising a record of the first table structure; defining a second table structure, corresponding to the derived class, including a second table name, the second table structure including: a second instance identifier field for storing a second instance identifier which identifies a particular instance of the derived class, and a second field for storing instances of the second attribute, the second instance identifier field and the second field comprising a record of the second table structure; and referencing the second instance identifier field to the first instance identifier field.

Another method for a computer to translate an Abstract Syntax Notation object class definition into a relational schema, includes the steps of: providing an Abstract Syntax Notation class definition of object information comprising a first attribute; defining a first table structure, corresponding to the object class, including: a first table name, the first table structure including: a first instance identifier field for storing a first instance identifier which identifies a particular instance of the object class, and a first field for storing instances of the first attribute, the first instance identifier field and the first field comprising a record of the first table structure.

The features of the invention believed to be novel are set forth with particularity in the appended claims. The invention itself however, both as to organization and method of operation, together with further objects and advantages thereof, may be best understood by reference to the following description taken in conjunction with the accompanying drawings and examples.

BRIEF DESCRIPTION OF THE DRAWING

FIG. 4A shows a relational mapping deriving from direct attribute constructs used in the definition of a managed object class template in ASN.1 macro notation.

DETAILED DESCRIPTION OF THE INVENTION

1. Overview

Figure 1:
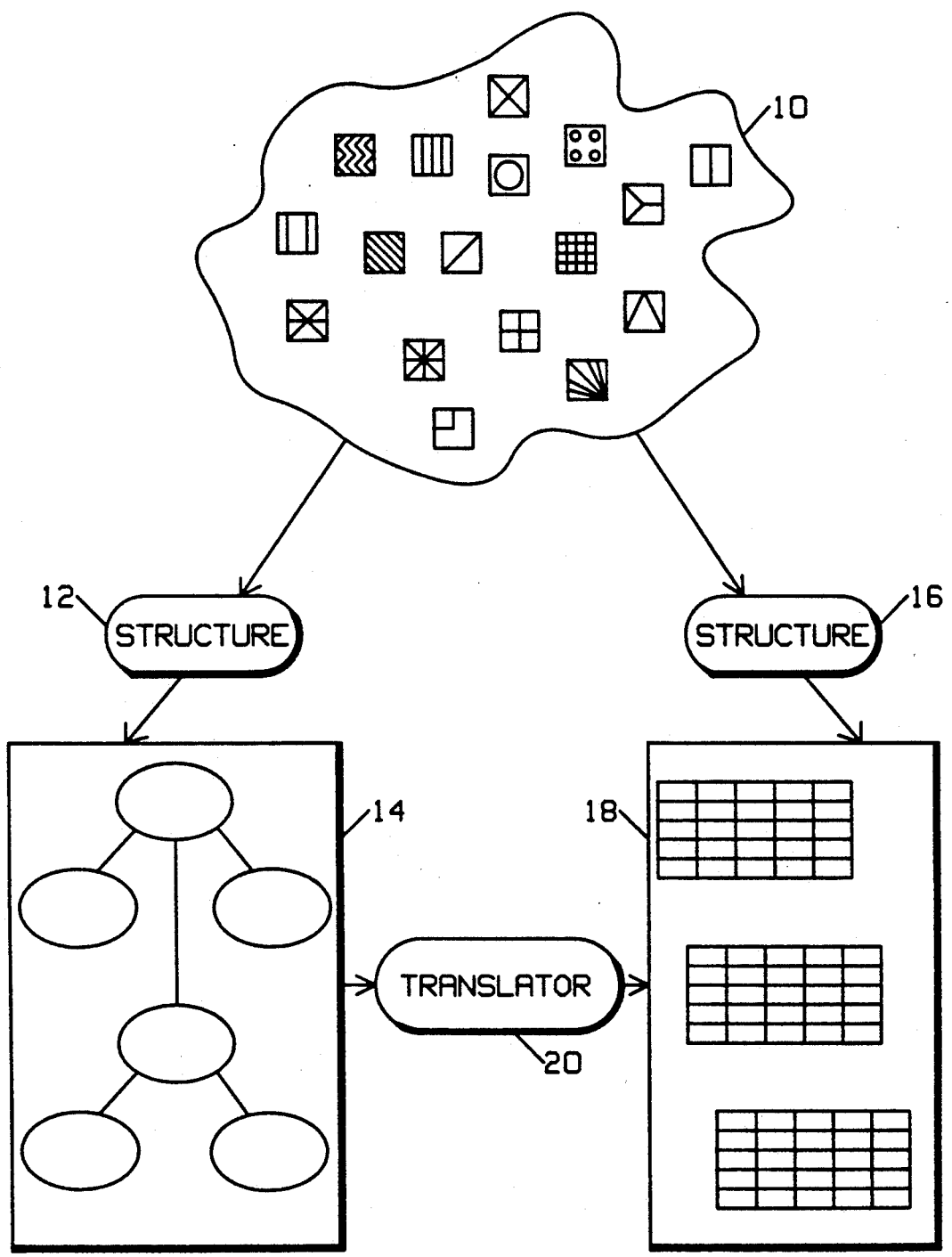
FIG. 1 illustrates the concept of the translator of the present invention.

The preferred embodiment of the present invention is implemented in the form of a translator which converts ASN.1 object-oriented representations into relational tables. This concept is illustrated in FIG. 1 which shows unstructured data 10 upon which structure may be imposed in either of two ways. When structure is imposed by modeling process 12, an object class hierarchy organization 14 of the data results. When structure is imposed by modeling process 16, a relational schema organization 18 results. The present invention bridges these two structured representations of data by providing a translator from a class hierarchy organization such as 14 to a relational schema organization such as 18 providing a mechanism for persistent storage of data using known relational database techniques.

The technique of the preferred embodiment of the present invention will be illustrated in examples with source constructs in ASN.1, interfaced with relational database requests issued in standard SQL. However, this is not restrictive, as this technique can be used with other object representations with any appropriate relational database. Standard SQL is described, for example, in "A Guide to the SQL Standard", by C. J. Date, 2nd Ed., Addison Wesley, 1989. ASN.1 is described in "Abstract Syntax Notation One: The Tutorial and Reference", Douglas Steedman, The PSC Institute, 1990 which is incorporated by reference.

The present invention will be described with the help of flow charts to describe the actual process, followed by ASN.1 and SQL examples. All examples are from the realm of object modeling in a communications network. With the possible exception of occasional simplifications for conceptual clarity, all examples conform to object modeling guidelines proposed by various standards bodies. A basic familiarity with SQL and ASN.1 is assumed.

Before proceeding with a discussion of the invention itself, it may be helpful to provide a brief discussion of the physical environment associated with the sample code, that is a communication network. Such a communication network may be made up of many physical devices such as modems, digital service units (DSU's), terminals, computers, multiplexers and such equipment coupled together via, for example, telephone lines, fiber optic channels, satellite links, etc. A typical example of such a network is an airline reservation system where numerous terminals (at airports, travel agencies, airline reservation offices, etc.) communicate with a central computer to access reservation information, flight schedules, seat assignments, etc. In such networks, there is typically a network management function which is used to monitor the network and determine the cause of any malfunction. In these environments, it is often critical to operation of the business to have the system fully operational nearly 100% of the time. Network management functions are used to quickly isolate problems and possibly reroute data traffic to circumvent problems.

As part of the data communication network management system, a database containing various attributes of all physical objects (e.g. modems, DSU's, multiplexers, etc.) is usually maintained to facilitate the above functions. In order to utilize OOP techniques in the network management function, it is desirable to be able to provide persistent storage of the attributes of these objects managed by the network management system. With this background on the physical characteristics of the environment used for the examples, we can proceed with a discussion of the invention itself.

Figure 2:
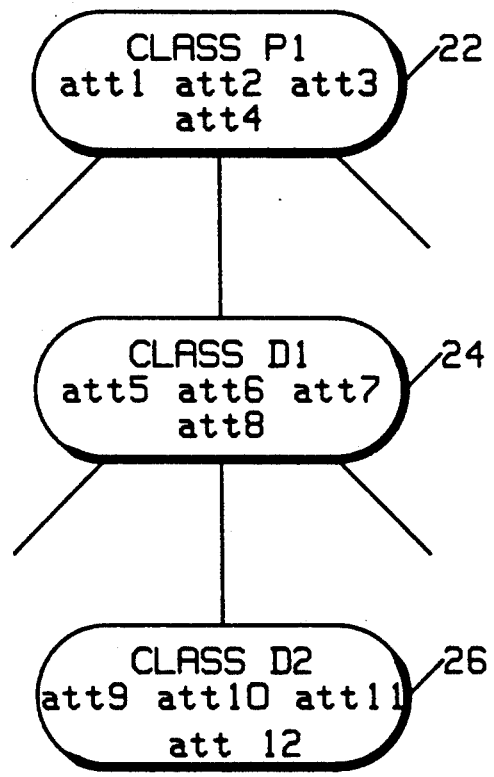
FIG. 2 shows a class hierarchy structure which is translated into the relational table structure of FIG. 3.

In ASN.1, as well as other implementations of OOP, objects are represented using the class construct. A simple graphic example is shown in FIG. 2. A parent class 22 (designated P1) may have several attributes associated with it, for example attributes shown as att1, att2, att3 and att4. Such attributes might represent any physical attribute being manipulated by the program (e.g. temperature, color, size, manufacturer, modem speed, service contract number, etc. etc.). A derived class 24 (designated D1) inherits the attributes of parent class 22 and, in addition, derived class 24 has its own attributes designated att5, att6, att7 and att8. Similarly, derived class 26 (designated D2) inherits attributes att1 through att8 from derived class 24 and parent class 22 and contributes its own attributes att9, att10, att11 and att12. An instance of derived class 26, therefore, includes all attributes att1 through att12 which fully define the object instance for purposes of the system at hand. This graphic example can be constructed using ASN.1 predefined macros to define the hierarchical relationship shown in FIG. 2.

The macros used to illustrate examples in the present invention are the ASN.1 Managed Object Class macros defined by various network management standards bodies (such as those of the OSI/Network Management Forum specified in "Forum 003: Object Specification Framework" and ISO/CCITT specified in "X.722/ISO 10165-4: Structure of Management Information Part 4"). However, the present invention should not be restricted to these standards alone.

Figure 3:
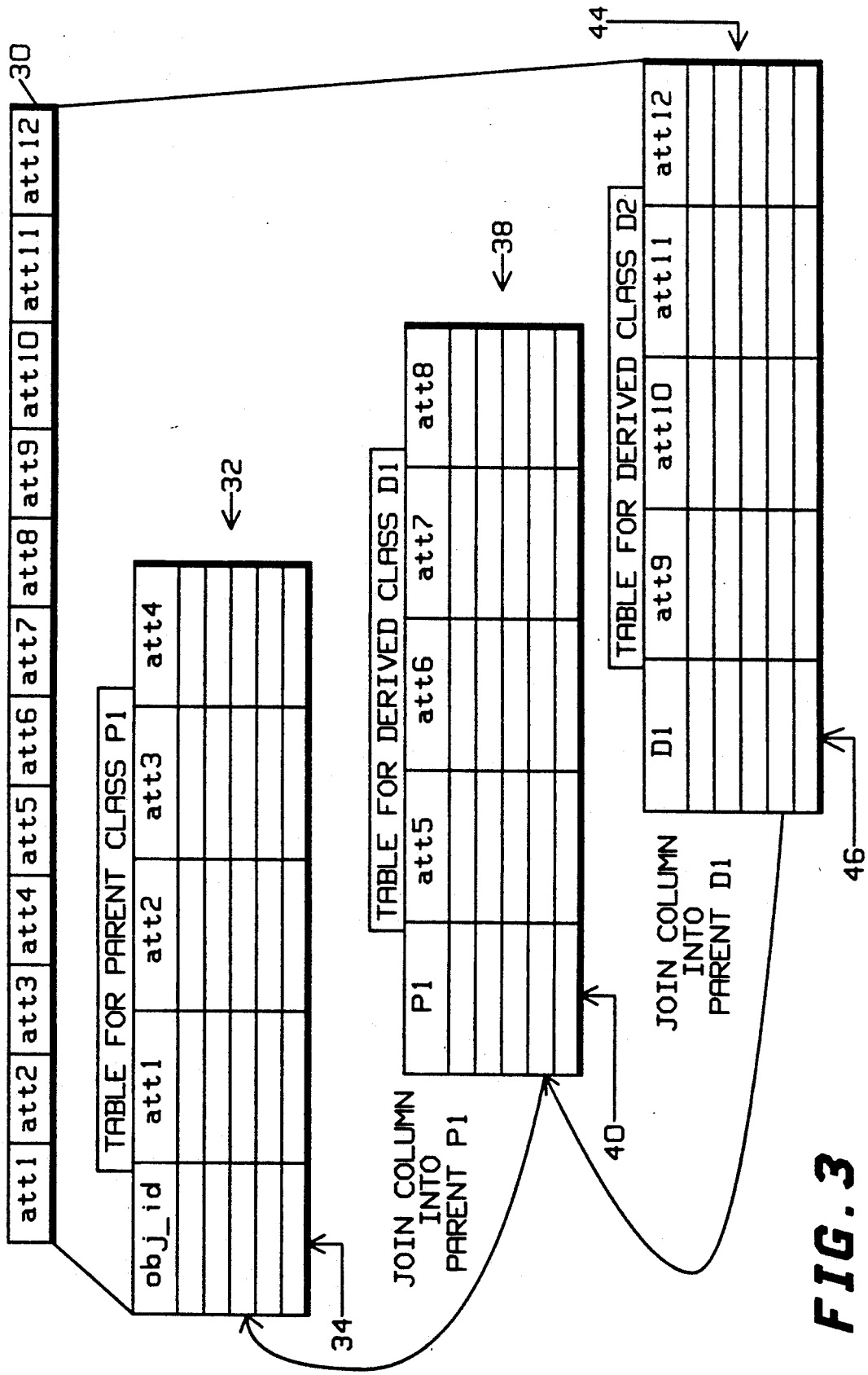
FIG. 3 shows a relational table structure representing the simple class hierarchy structure of FIG. 2.

The present invention provides a mechanism for mapping this hierarchical schema into a relational table schema. Consider, for example, FIG. 3 in which an instance of derived class 26 is represented as a list of attributes 30. This list of attributes represents the form of information that a user of the system is interested in as a characterization of the instance of an object in class 26. Parent class 22 is mapped to a table 32 which is named after the class name (P1) and which has four field columns defined for attributes att1 through att4. A fifth column 34 is defined to carry an object identifier (obj__id) which may be generated by the translator 20. Records of this table (rows) are used to carry instances of all objects of class 22.

In a similar manner, a table 38 is constructed representing derived class 24. Table 38 is named D1 after the class 24 and includes field columns for attributes att5 through att8. In addition, a field column 40 is named P1 after the parent class above class 24 in the hierarchy. In the preferred embodiment, this field contains the same object identifier (obj__id) as that used in table 32.

A third table 44 is constructed to represent derived class 26. Table 44 is named D2 after the name of class 26 and has four field columns representing attributes att9 through att12. A fifth column is named after the parent table or class as D1 and carries the same object identifier as those carried by tables 32 and 38 in the preferred embodiment. The three tables can be queried to extract a particular instance of class 26 by using, for example, a "JOIN" operator from SQL to find all attributes in records having the same object identifier in fields obj__id of table P1, field P1 of table D1 and field D1 of table D2.

Figure 4B:
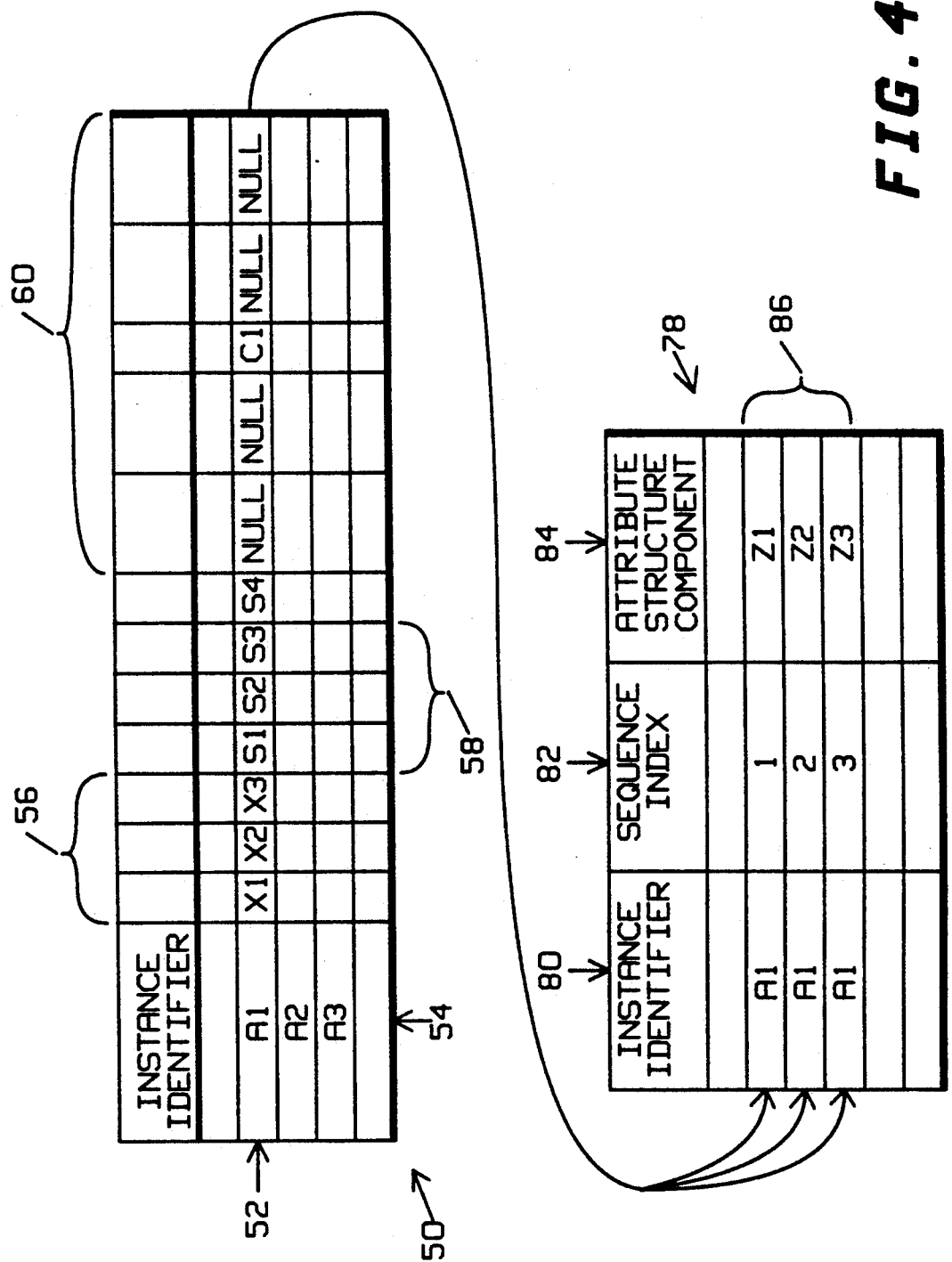
FIG. 4B shows additional relational mappings as in FIG. 4A.

FIG. 4A taken in conjunction with FIG. 4B shows how certain ASN.1 constructs map into a relational schema. In particular, it shows how direct attributes of a Managed Object Class Template, including SET and SEQUENCE attributes of specified size, as well as CHOICE attributes, become direct columns in the table corresponding to the managed object class. It also shows that MULTI-VALUED attributes, as well as SET and SEQUENCE attributes of unspecified size are isolated into their own tables with an "instance identifier" column providing the joining linkage back to the table for the Managed Object Class.

Table 50 is a mapping of the basic object class macro. Columns of table 50 indicate specific attributes of the object class. Record 52 indicates an instance of the object class with specific attribute values for that instance stored in its various columns. Column 54 is the instance identifier for that object class and serves as a key into the entire table. Columns 56 are examples of direct attributes of primitive ASN.1 types defined for the object class. Columns 58 show a relational representation of direct attributes of structured ASN.1 types of specified size, such as SET or SEQUENCE defined for the object class. Columns 60 show a relational representation of a CHOICE ASN.1 type attribute defined for the object class.

Table 62 indicates a relational representation of a MULTI-VALUED ASN.1 attribute defined for the object class which is isolated in its own separate Table. Records 64 are instances of this MULTI-VALUED attribute belonging to the same object instance stored in Table 50. The instance identifier column 66 of Table 62 stores the same value as the instance identifier column 54 of Table 50 linking the two tables together and providing a mechanism for reconstructing the entire object. Column 68 of Table 62 stores the corresponding instances of the MULTI-VALUED attribute. If the MULTI-VALUED attribute is in turn a structured type, then additional columns may be necessary in Table 62, or additional dependent tables may be necessary.

Table 70 shows a relational representation of a structured ASN.1 attribute of unspecified size of the object class (such as SET OF). Records 76 are the components of the instances of the structured attribute belonging to the same instance of the object class that was stored in Table 50. The instance identifier column 72 of Table 70 holds the same value as the instance identifier column 54 of Table 50, serving as a mechanism to link the two tables. Column 74 of Table 70 stores the values of the instances of the structured attribute. If the structured attribute is in turn a structured ASN.1 type, then additional columns may be necessary in Table 70, or additional dependent tables may be necessary.

Table 78 of FIG. 4B shows a relational representation of a structured ASN.1 attribute of unspecified size of the object class (such as SEQUENCE OF). Records 86 are the instances of the structured attribute belonging to the same instance of the object class that was stored in Table 50. The instance identifier column 80 of Table 78 holds the same value as the instance identifier column 54 of Table 50, serving as a mechanism to link the two tables. Column 84 of Table 78 stores the values of the instances of the structured attribute. If the structured attribute is in turn a structured ASN.1 type, then additional columns may be necessary in Table 78, or additional dependent tables may be necessary. In addition, column 82 of Table 78 stores a sequence index to indicate the order of appearance of attribute instances in the structured type for use in reconstructing the SEQUENCE type.

Figure 4C:
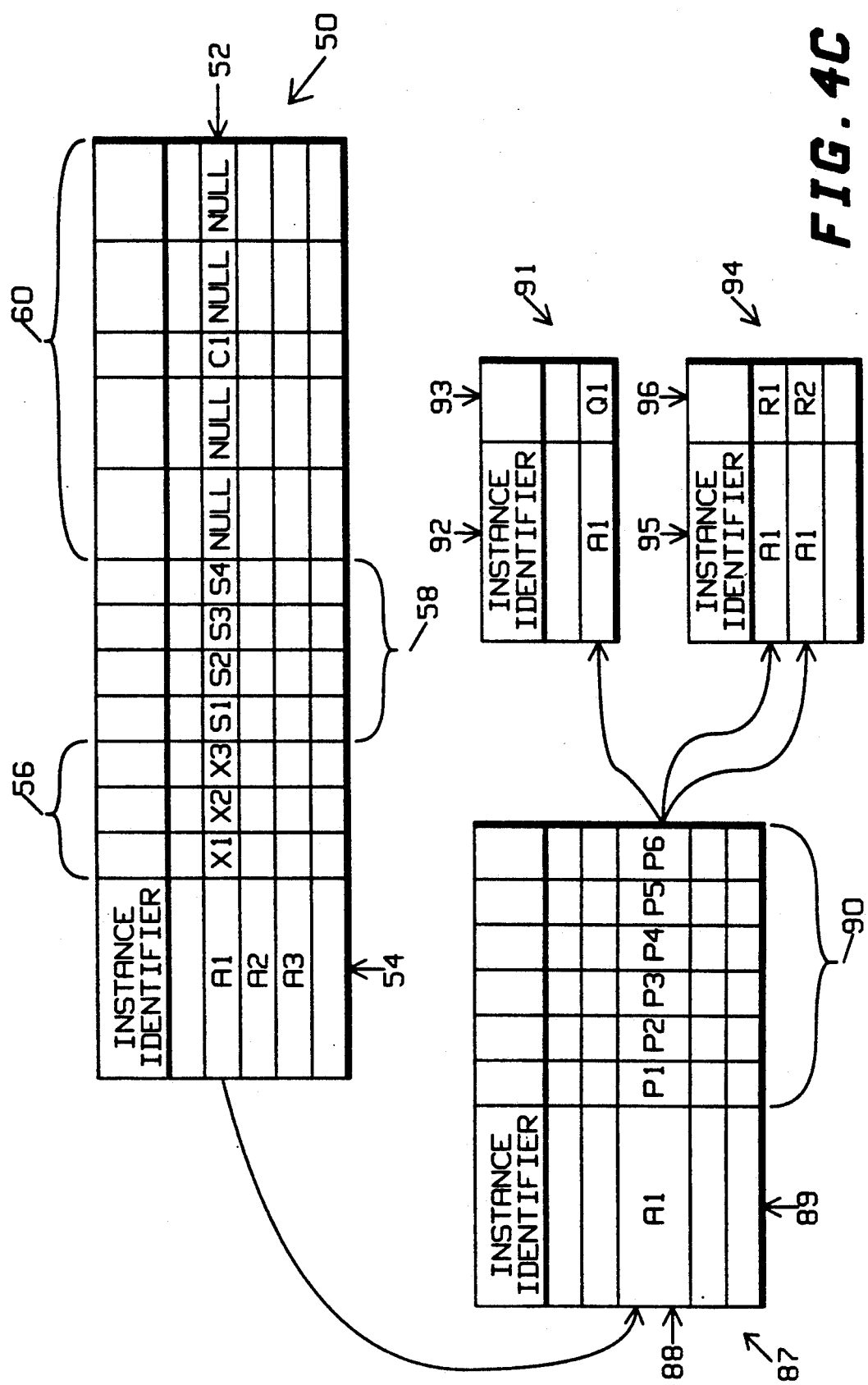
FIG. 4C shows a relational mapping deriving from attribute group constructs used in the definition of a managed object class template in ASN.1 macro notation.

FIG. 4C shows how ASN.1 constructs corresponding to ATTRIBUTE GROUPS or CONDITIONAL PACKAGES map into a relational schema. These are mapped into separate tables for normalization purposes, as will be explained later. Any SET, SEQUENCE or MULTI-VALUED attributes which are part of such packages are treated similarly. That is, they are isolated into sub-tables if they are of unspecified size, or stored as direct columns if they are of specified size.

All ATTRIBUTE GROUPS and CONDITIONAL PACKAGES are isolated into separate tables of their own such as Table 87. Record 88 of Table 87 indicates an instance of such an ATTRIBUTE GROUP or CONDITIONAL PACKAGE. Column 89 of Table 87 stores an instance identifier holding the same value as column 54 of Table 50 indicating the object instance stored in Table 50 possessing that ATTRIBUTE GROUP or CONDITIONAL PACKAGE. Columns 90 of Table 87 store actual instances of attributes within the ATTRIBUTE GROUP or CONDITIONAL PACKAGE. Tables 91 and 94 are examples of how structured types of unspecified size or MULTI-VALUED attributes which may be part of the ATTRIBUTE GROUP or CONDITIONAL PACKAGE are mapped into the relational schema by isolating them in their own table in a manner similar to Tables 62 and 70 of FIG. 4A. Columns 92 and 95 of Tables 91 and 94 respectively store the same instance identifier value as stored in column 89 of Table 87 and column 54 of Table 50, serving to link the four tables. Columns 93 and 96 of Tables 91 and 94 respectively store actual instances of the structured ASN.1 attributes of unspecified size.

2. Mapping of Object Representations into Relational Schema 2.1 Object Representation In standards being defined by Data Communications and Telecommunications standards bodies (such as the OSI/Network Management Forum, ANSI TIM1, and the CCITT X.700 series), objects are represented using ASN.1 macro notation. The macro notation defines a template for creating managed objects, and as such, can be viewed as analogous to a schema definition in a relational database.

Typically, objects are defined in an object class hierarchy. This is done using clauses such as DERIVED FROM or SUBCLASS OF in the macro notation template. Further, attributes in each object macro are defined, with the syntax of each attribute expanding into an appropriate ASN.1 primitive type specified in the WITH ATTRIBUTE SYNTAX clause.

For example, the following template is used by the OSI/Network Management Forum to define object classes. (Henceforth this will be referred to as the Forum Object Template).

```
{class-label}M-OBJECT-CLASS
    DERIVED FROM {superclass}
    [DIRECTORY {directory-object-class}]
    BEHAVIOR DEFINITIONS {definition-source}
    CHARACTERIZED BY
        ATTRIBUTES
            MUST CONTAIN    {attribute [qualifier],
                             attribute [qualifier],
                             ...}
            MAY CONTAIN     {attribute [qualifier],
                             attribute [qualifier],
                             ...}
        [GROUP ATTRIBUTES
            MUST CONTAIN    {attribute [qualifier],
                             attribute [qualifier],
                             ...}
            MAY CONTAIN     {attribute [qualifier],
                             attribute [qualifier],
                             ...}]
        OPERATIONS
            [CREATE]
            [DELETE]
            [ACTIONS        {action-name,
                             action-name,
                             ...}]
        [NOTIFICATIONS      {notification-name,
         notification-name,
         ...}]
```

In the above notation (which is a predefined ASN.1 macro), uppercase tokens indicate reserved keywords in the macro notation, whereas lowercase tokens indicate instance variables, i.e. values which will vary between different instances of the object class. Sequences of unspecified size are indicated using an ellipsis. Notation inside square brackets is optional, i.e. could be omitted if not applicable in the definition of a given instance of the object class. Further, comments in ASN.1 are introduced by the double hyphen (--) sequence.

ISO Standard 10165-4 (OSI Management INformation Services-Structure of Management Information Part 4, Guidelines for the Definition of Managed Objects), which is aligned with the CCITT Standard X.722, uses an object macro notation for managed objects which is similar in philosophy, although the actual ASN.1 syntax is different. (Henceforth this will be referred to as the GDMO Object Template). This template is:

```
{class-label}          MANAGED OBJECT CLASS
    [DERIVED FROM      {class-label,
                       class-label,
                       ...};]
    [ALLOMORPHIC SET   {class-label,
                       class-label,
                       ...};]
    [CHARACTERIZED BY  {package-label,
                       package-label,
                       ...};]
    [CONDITIONAL PACKAGES {package-label} PRESENT
                       IF {condition},
                       {package-label} PRESENT IF
                       {condition},
                       ...};]
    [PARAMETERS        {parameter-label,
                       parameter-label,
                       ...};]
```

Both the above notations create packages of information, which group together a set of concepts which collectively characterize a "Managed Object". Further, this information package is viewed as an object in an Object Class Hierarchy. The classes identified in the DERIVED FROM clause of the above template are said to be the superclasses (or parent classes) of the current class. These are the classes above it in the hierarchy, which implies that the current class automatically possesses all attributes identified for its superclasses (i.e. it inherits them). In turn, other classes may identify the current object as their superclass, which implies they would inherit all the attributes defined in the current class template. Such classes are termed subclasses (or child classes) of the current class.

These macro notations are used to declare instances of actual managed objects. For example, an instance of such use is the definition of the "equipment" managed object class, taken from the OSI/Network Management Forum's Library of Managed Object Classes, Name Bindings and Attributes (hereinafter referred to as the Forum Library):

```
equipment M-OBJECT-CLASS
    DERIVED FROM {top}
    BEHAVIOR DEFINITIONS -- see section 3-13
    CHARACTERIZED BY
        ATTRIBUTES
            MUST CONTAIN {
                        administrativeState,
                        equipmentID READ-ONLY,
                        locationName,
                        operationalState READ-ONLY
                        }
            MAY CONTAIN [
                        contactName,
                        customerName,
                        equipmentType,
                        functionNames,
                        manufacturerName,
                        manufacturerText,
                        networkNames,
                        productLabel,
                        release,
                        serialNumber,
                        serviceNames,
                        softwareNames,
                        typeText,
                        userLabels,
                        vendorNames
                        ]
    OPERATIONS
        CREATE
        DELETE
    NOTIFICATIONS {
                        addValue,
                        attributeChange,
                        deenrolObject,
                        enrolObject,
                        environmentalAlarm,
                        equipmentAlarm,
                        processingAlarm,
                        removeValue
                        }
::= {forum-objectClass 12}
```

In the above example, the object class template is used to declare an instance of the equipment managed object class, which has attributes specified as above. For the purposes of the current invention, the identified OPERATIONS, NOTIFICATIONS and BEHAVIOR DEFINITIONS clauses are not important and will be ignored. Also, the value assignment for the macro instance, which is specified in the clause ::= {forum-objectClass 12 } is called the delivered value of the macro, and is important only for registration purposes and for encoding in a protocol data stream (using any ASN.1 transfer syntax, such as the Basic Encoding Rules) for communication purposes. As such, it is not relevant to the current invention, and will be ignored.

Further, the Forum Library also contains example of object classes that are subclasses of the "equipment" class, e.g.:

```
processingEntity M-OBJECT-CLASS
    DERIVED FROM           {equipment}
    BEHAVIOR DEFINITIONS -- see section 3.25
    CHARACTERIZED BY
        ATTRIBUTES
            MUST CONTAIN    {
                            cPU-Type READ-ONLY,
                            memorySize READ-ONLY,
                            osinfo READ-ONLY,
                            wordSize READ-ONLY
                            }
            MAY CONTAIN     {
                            cPUutilization
                            }
:: = {forum-objectClass 24}
```

The above instance of use of the M-OBJECT-CLASS macro states that a "processingEntity" derives from "equipment", i.e. it is a kind of equipment, and as such inherits all attributes, operations, notifications, etc. from the equipment object class, which has been defined earlier. As such, those characteristics need not be defined over again for the processingEntity object class. Besides possessing its inherited attributes, the processingEntity object class defines some additional attributes of its own, i.e. those stated in the macro definition 5 above. Thus, a processingEntity is a specialized kind of equipment, since it refines the concept of equipment and introduces additional characteristics besides those it inherits from the equipment object class.

Note, however, that equipment itself derives from "top", i.e. has no superclasses, and thus no significant attributes it automatically inherits. In turn, classes other than "processingEntity" may derive from "equipment", which means they have all the characteristics of "equipment", plus additional ones which they introduce to specialize themselves.

Now consider representing such information within the schema of a relational database. To do so, two new examples from the Forum Library of Object Classes are used:

```
location M-OBJECT-CLASS
    DERIVED FROM {top}
    BEHAVIOR DEFINITIONS -- see Section 3.21
    CHARACTERIZED BY
        ATTRIBUTES
            MUST CONTAIN {
                geographicCoordinates,
                locationID READ-ONLY,
                locationDetails,
                locationType,
                postalAddress
                }
            MAY CONTAIN {
                contactNames,
                typeText,
                userLabels
                }
        OPERATIONS
            CREATE
            DELETE
        NOTIFICATIONS {
            addValue,
            attributeChange,
            deenrolObject,
            enrolObject,
            removeValue
            }
::= {forum-objectClass 20}
``` which defines the "location" managed object class, and

```
vendor M-OBJECT-CLASS
    DERIVED FROM {top}
    BEHAVIOR DEFINITIONS -- see section 3.35
    CHARACTERIZED BY
        ATTRIBUTES
            MUST CONTAIN {
                contactNames,
                vendorID READ-ONLY,
                }
            MAY CONTAIN {
                userLabels
                }
        OPERATIONS
            CREATE
            DELETE
        NOTIFICATIONS {
            addValue,
            attributeChange,
            deenrolObject,
            enrolObject,
            removeValue
            }
::= {forum-objectClass 34}
``` which defines the "vendor" object class.

Assuming for the time being that: (1) all attributes in the object classes defined above map into primitive numeric or character types, and (2) there are no multi-valued attributes (these assumptions will be refined later on), it is easy to see how these class definitions could map to a relational database schema, of the tabular data structures. For example, the three classes defined above may be mapped to the following type of table structures:

TABLE 1

| TABLENAME: Vendor | | |
|---|---|---|
| vendorID | contactNames | userLabels |

TABLE 2

| TABLENAME: Location | | | | |
|---|---|---|---|---|
| locID | coord | details | type | address |
| contactNames | | typeText | | userLabels |

TABLE 3

| TABLENAME: Equipment | | | | |
|---|---|---|---|---|
| equipmentID | adminState | locName | operationalState | contactNames |
| custNames | eqType | functNames | ManufNames | manufTex |
| netNames | productLabel | release | serialNo | serviceNames |
| softwareNames | | typeText | userLabels | vendorNames |

With the above definition of relational schema, when actual instances of vendors, locations and equipment are declared, corresponding records can be inserted into each one of the above table structures.

In every case, the identifying attribute (e.g. equipmentID, vendorID, or locationID) is the attribute used to uniquely identify the name of the corresponding instance of object.

The above example shows how a class definition may be mapped to a relational schema, under the assumption that attributes map into primitive types. Since this procedure is simple and algorithmic, it can be automated using a computer program. This function is provided by the current invention.

The MIB Schema Compiler is designed to operate with source ASN.1 macros as input. The program contains lexical analysis capability, which tokenizes the input stream scanning for constructs of interest. Since the only source constructs of interest are M-OBJECT-CLASS, ATTRIBUTE, GROUP ATTRIBUTE and NAME BINDING macro definitions (along with supporting type reference and value reference productions in imported ASN.1 modules), the lexical analysis capability is a subset of that available in any standard ASN.1 parser with macro capability. It is assumed that such capability is available, and is not described in detail. What is of interest here is the actions taken by the MIB Schema Compiler once such constructs are recognized.

Consider now a refinement of the assumptions made in the presentation of the above example. In reality, some of the attributes specified in the M-OBJECT-CLASS macro examples above, may not map to simple character or numeric types. They may internally have the format of complex record type, thus making it difficult to store it as a single column within the table corresponding to the object class. Further, other attributes may be multi-valued, thus again being impossible to store within a single column of a relational table.

The exact nature of each attribute can be determined by examining its ATTRIBUTE macro. A few ATTRIBUTE macros are reproduced here from the Forum Library, which are subsets of the attributes used in the examples above:

```
-- Expansion of selected attributes of the equipment M-OBJECT-CLASS
equipmentID ATTRIBUTE
        WITH ATTRIBUTE SYNTAX    FORUM-TYPES-1.NamingString
        MATCHES FOR EQUALITY     SUBSTRINGS
        SINGLE-VALUED
    ::= {forum-attribute 35}
locationName ATTRIBUTE
        WITH ATTRIBUTE SYNTAX    FORUM-TYPES-1.Name
        MATCHES FOR EQUALITY
        SINGLE-VALUED
    ::= {forum-attribute 65}
manufacturerName ATTRIBUTE
        WITH ATTRIBUTE SYNTAX    FORUM-CMIP.DistinguishedName
        MATCHES FOR EQUALITY
        SINGLE-VALUED
    ::= {forum-attribute 80}
contactNames ATTRIBUTE
        WITH ATTRIBUTE SYNTAX    FORUM-TYPES-1.Name
        MULTI-VALUED
    ::= {forum-attribute 25}
-- Expansion of selected attributes of the location M-OBJECT-CLASS
locationID ATTRIBUTE
        WITH ATTRIBUTE SYNTAX    FORUM-TYPE-1.NamingType
        MATCHES FOR EQUALITY     SUBSTRINGS
        SINGLE-VALUED
    ::= {forum-attribute 64}
-- Expansion of selected attributes of the vendor M-OBJECT-CLASS
vendorID ATTRIBUTE
        WITH ATTRIBUTE SYNTAX    FORUM-TYPES-1.NamingType
        MATCHES FOR EQUALITY     SUBSTRINGS
        SINGLE-VALUED
    ::= {forum-attribute 161}
```

In relation to processing the ATTRIBUTE definitions in the examples above, the following type references in the ASN.1 modules FORUM-CMIP and FORUM-TYPES are also of interest:

```
-- Imported from module FORUM-TYPES
    NamingString ::= PrintableString (SIZE(64))
    NamingType ::= CHOICE {
        nonRootNameBinding NamingString,
        rootNameBinding1 OBJECT IDENTIFIER,
        rootNameBinding2
                Information-Framework.DistinguishedName
                    -- Directory DN
        }
    Name ::= CHOICE {
        null NULL
        -- a name may be null because a relationship does not
        -- exist or the information is unavailable or unknown
        classAndInstance SEQUENCE {
            managedObjectClass ObjectClass,
            managedObjectInstance ObjectInstance
            }
        }
-- Imported from module FORUM.CMIP
    ObjectClass ::= CHOICE {
        globalForm [0] IMPLICIT OBJECT IDENTIFIER,
        localForm [1] IMPLICIT INTEGER
        }
    ObjectInstance ::= CHOICE {
        distinguishedName [2] IMPLICIT DistinguishedName
        nonSpecificForm [3] IMPLICIT OCTET STRING,
        localDistinguishedName [4] IMPLICID RDNSequence
        }
    DistinguishedName ::= RDNSequence
    RDNSequence ::= SEQUENCE OF RelativeDistinguishedName
    RelativeDistinguishedName ::= SET OF AttributeValueAssertion
    AttributeValueAssertion ::= Attribute
    Attribute ::= SEQUENCE {
        attributeID AttributeID,
```

```
-continued
    attributeValue ANY DEFINED BY attributeID
    }
    -- attributeValue type defined in ATTRIBUTE template for
    -- corresponding attribute
Attribute ID ::= CHOICE {
    globalForm [0] IMPLICIT OBJECT IDENTIFIER,
    localFORM [1] IMPLICIT INTEGER
    }
```

The naming attribute (or identifying attribute) for every instance of a managed object class, is different depending on the managed object class. However, as can be seen above, the most general form of the name of an object instance its definition in terms of an object class identifier and an object instance identifier. The identifier is, in turn, most generally defined as a DistinguishedName construct. This construct is a set of Attribute Value Assertions (e.g. Att1=value1, Att2=value2, Att3=value3).

Obviously, it would be difficult to store a sequence of such attribute value assertions of unknown length in a single column of a table in a relational database. (Of course, the whole thing could be stored in a single column as an indefinitely long text string, but this is not meaningful as it does not allow meaningful operations of searching, sorting, and manipulation based on component attribute values).

The present invention stores management information for related object classes together, since it generates one table for every object class. Thus, information about different instances of the same object class is stored as different records in the same table. However, given the naming scheme above, it is possible that different instances of the object class have widely varying names, the variation being not only in content but also in the length of the name. Thus, some intelligent mechanism is needed to use these names to uniquely identify records corresponding to different object instances when this information is stored in the table.

In the current invention, an assumption is made that the Distinguished Name of every object instance is mapped onto a local form, such as an integer, which can be stored in a single numeric column of a relational table. Further, it is assumed that this local form of the instance identifier is drawn from a unique name space, such that two different Distinguished Names will never encode to the same local form. In addition, it is assumed that the full global Distinguished Name can always be recovered by deciphering its encoded local form.

In practice, the above encoding of a Distinguished Name to a local form is not hard to achieve. One way to achieve this would be to have a separate lookup table in the database, which maps a sequence of Attribute Value Assertions to a unique numeric integer, which would then be used as the key into the table for the corresponding object class. Other techniques will occur to those skilled in the art. Such a table could be designed as pairs of repeating columns, (attribute name and attribute value), which map to an instance identifier, which would be a numeric integer:

TABLE 4

DISTINGUISHED NAME MAPPING TABLE

| Att Id | Att Val | Att Id | Att Val | ... | Table Name | Column Name | Instance Identifier |
|--------|---------|--------|---------|-----|------------|-------------|---------------------|
|        |         |        |         | ... |            |             |                     |

This table is generated by the MIB Schema Compiler automatically. The number of pairs of repeating columns desired is indicated to the program as an option. In practice, the number of pairs would be the depth of search in the naming tree the system is required to support in order to comply with a given set of implementation conformance requirements.

The Attribute Id columns above store the globally registered name of the attribute, which are ASN.1 Object Identifiers (The encoding of Object Identifiers, which are sequences of integers, for storage in a single column of a relational table, is described later on). The Attribute Value columns store a value whose type depends on the type of attribute the Attribute Identifier column specifies (ANY DEFINED BY AttributeId). Although the most general implementation of such a column of unknown type is a BLOB (Binary Large OBjects), the current invention implements all Attribute Value columns above as text strings. It is felt that the most practical implementation of naming attributes would be either numeric or character string identifiers, both of which can be easily represented as text strings in a table column, but this is not to be limiting.

The above table may be used in either direction—e.g. to determine the table and instance identifier given a Distinguished Name, or vice versa. Further, it allows searches, sorting, and lookup based on partially known names, or specific values of components of a name. This is useful for scoping in management applications.

In addition, the TableName and ColumnName are not really required (since the Table itself is identified from the decoding of the Object Class identifier in the Name ASN.1 construct defined above). However, they are included for full generality and also to allow for partially compliant systems.

An alternative way of storing Distinguished Names, instead of generating the Distinguished Name Mapping table above, would be to store the direct encoding of the complete Distinguished Name construct as a large integer in the identifier column of the table corresponding to the object class. Any desired coding mechanism can be applied, but the most convenient, of course, is the set of ASN.1 Basic Encoding Rules. Normally, these rules are invoked to encode constructs (such as Distinguished Name above) as a sequence of bytes for communication in a protocol data stream. The same encoding rules can also be used to generate the same sequence of bytes, but instead of transmitting them in a protocol data stream, this sequence of bytes can be interpreted as a number and stored in the identifying attribute column of the database table for that class. This has the advantage that the entire Distinguished Name can be recovered merely by applying a standard ASN.1 decoder to the number read in from the column (instead of doing a table lookup), but searching based on name components becomes more difficult and complicates the application software.

Once the MIB Schema Compiler recognizes an Object Class macro, it issues a command in standard SQL to create a relational database table corresponding to that Object Class macro. The following rules and conventions are used by the MIB Schema Compiler in creating the schema:

1. The name of the table is the same as the identifier used for the Object Class macro name.
2. Based on the cardinality of every attribute (single-valued or multi-valued) and its type, a decision is made as to whether the attribute information is stored as column in the table for the Object Class, or is partitioned into a separate table.
3. If the attribute information is to be stored as a column in the Object Class table, the name of the column is the same as the identifier used for the attribute name.
4. The naming attribute is always stored as a column in the Object Class table (the naming attribute being identified by NAME BINDING macros).

Further, each attribute is processed individually, to determine how it may be best be stored. Every attribute type is parsed down to its component ASN.1 primitive types, and each is handled accordingly:

1. Attributes that are multi-valued are not stored in the same table as the Object Class in the preferred embodiment, but a separate table is created for them. This is because multi-valued attributes are lists, i.e. imply a many-to-one relationship between the attribute and the possessing object. As such, they are best isolated in their own table in the interests of database normalization.

The generated name of the table for storing multi-valued attributes is the identifier for the Object Class followed by the identifier for the attribute, conjoined by a separator (e.g. a period, as in "equipment.contactNames"). This table contains at least two columns—one to store the id for the Object Class Instance and at least one other to store the value of attribute. Additional columns may be required depending on syntax of the actual value of the attribute, as explained below.

Thus, the "contactNames" attribute for the equipment Object Class above, which is multi-valued, can be conceptually thought of as being stored in the following table schema:

TABLE 5

| equipmentId | contactNames |
|---|---|
| 123 | Joe Smith |
| 123 | John Doe |
| 321 | Jack Sprat | which makes it possible to store a multi-valued "contactNames" attribute for the same equipment instance. Were we to store the "contactNames" attribute as a single column in the equipment table, normalization principles would have been violated. (In a real implementation, the single "contactNames" column in the example above would be replaced by several columns after full expansion of the contactNames attribute.)

2. Group attributes are always stored in a separate table of their own. (This is because group attributes may comprise complex internal structures, and not every instance of an Object Class may possess that group attribute). The name of the table is the identifier used for the possessing Object Class followed by the identifier used for the group attribute, conjoined by a separator (such as a period).

For every group attribute, its internal structure is expanded and resolved until its components do not contain any other group attributes, but consist only of simple attributes. Each such component simple attribute of the group attribute is handled according the specifications below.

Group attributes for a given object instance are stored as records in this table. An identifying column is created in the group attribute table, which stores the identifying attribute of the object instance which possesses that group attribute. In other words, the same value that is stored in the identifying column of the Object Class table, is stored in the identifying column of the group attribute table. This serves as the join column between the two records to reconstruct the complete description of the object instance.

3. All other attributes are parsed and analyzed until their types can be represented as primitive ASN.1 types (e.g. INTEGER, REAL, OBJECT IDENTIFIER, BOOLEAN, CharacterString, etc), or of primitive structuring operations on ASN.1 types (e.g. SEQUENCE, CHOICE, SET, SET OF, etc.)

Inner subtyping is implemented as range restrictions or enumerations on values of database fields. This is usually represented as a TRIGGER operation which restricts values that database entries may take, if the underlying relational database system supports the definition of triggers.

4. Primitive attributes are stored in the most natural form in the database fields. For example, INTEGERs, REALs and BOOLEANs are stored in columns defined correspondingly to be INTEGER, REAL and BOOLEAN fields. (If the database does not support all these types, they could all be stored in numeric fields). All string types are stored in CHARACTER or TEXT type fields. The width constraints on these fields are determined from the implementation conformance requirements, which would specify the maximum sizes of such information which needs to be stored.

5. The primitive BIT STRING and OCTET STRING types are stored in BLOB (Binary Large Object) columns, as they contain binary data whose length cannot be predicted at database definition time. If the underlying RDBMS does not support BLOBs, a character or text field may be defined to store these.

6. The primitive OBJECT IDENTIFIER type, however, needs special handling, since an OBJECT IDENTIFIER is in general a sequence of integers identifying arcs in the global object registration tree. Since this sequence is of unspecified size, it cannot be easily stored in a single numeric column.

One mechanism is to store the textual representation of the sequence of integers (e.g. the character string "1.2.124.360501.3.24") in a TEXT or CHARACTER column. This is the approach taken in the current invention. Another alternative would be to store a single integer in a numeric column, the integer being a unique encoded representation of the Object Identifier. Again, one such convenient encoding formula is the ASN.1 Basic Encoding Rules, which instead of being used as a uniquely map this sequence of integers into a single, large integer, which can be stored in a single field in a database column.

7. Attributes which are derived from structuring operations on primitive types are handled differently, as follows:

1. SEQUENCE types are simply broken down into their component primitives. Thus, a SEQUENCE type of three primitive types, would generate three columns in the definition of the table for the Object Class, each column being of the type appropriate to the ASN.1 primitive type.

2. SEQUENCE OF types are handled in two different ways, depending on whether the size of the sequence is known at database generation time.

If it is (i.e. if the definition reads, for example, SEQUENCE SIZE (5) OF INTEGER), then the appropriate number (in this example 5) of columns are created directly in the table for the Object Class, the column type again corresponding to the primitive type as explained earlier.

If the sequence is of unspecified size, it is isolated in a separate table of its own, much the same as the multi-valued attribute was treated earlier. However, since the ordering in a sequence is important, an additional "SequenceIndex" column is created to clearly identify the position of every element in the sequence. Thus, for example, if the Object Class "myObjectClass" were to have an attribute "myAttribute" whose type was SEQUENCE OF INTEGER, it would be partitioned into a separate table as follows:

TABLE 6

| TABLE: myObjectClass.myAttribute | | |
|---|---|---|
| myObjectClassId | SequenceIndex | SequenceComponent |
| 123 | 1 | 20 |
| 123 | 2 | 30 |
| 123 | 3 | 30 |
| 124 | 1 | 20 |

This type of normalization allows the storage of unspecified size sequences. The column containing the identifying attribute ("myObjectClassID" in the above example) serves as a reference back to the specific instance of the Object Class which possesses this sequence attribute.

3. SET types, like SEQUENCE types, are simply broken down into their component primitives. Thus, a SET type of three primitive component types, would generate three columns in the definition of the table for the Object Class, each column being of the type appropriate to the ASN.1 primitive type. (Unlike SEQUENCE types, the order in which these columns are generated is may vary, and it is up to the application software to ensure that, when storing instances of this attribute in these columns, that component of the attribute is stored in the correct column.)

4. SET OF types are handled in two different ways, depending on whether the size of the set is known at database generation time.

If it is (i.e. if the definition reads, for example, SET SIZE (5) OF INTEGER), then the appropriate number (in this example 5) of columns are created directly in the table for the Object Class, the column type again corresponding to the primitive type as explained earlier.

If the set is of unspecified size, it is isolated in a separate table of its own, much the same as the multi-valued attribute was treated earlier. Thus, for example, if the Object Class "myObjectClass" were to have an attribute "myAttribute" whose type was SET OF INTEGER, it would be partitioned into a separate table as follows:

TABLE 7

| TABLE: myObjectClass.myAttribute | |
|---|---|
| myObjectClassId | SetComponent |
| 123 | 20 |
| 123 | 30 |
| 123 | 30 |
| 124 | 20 |

This type of normalization allows the storage of unspecified size sequences. The column containing the identifying attribute ("myObjectClassID" in the above example) serves as a reference back to the specific instance of the Object Class which possesses this sequence attribute. (Note that, since the order of appearance of components in a set is not important, there is no need for an index column to identify position within the set.)

5. CHOICE components imply that the attribute may take on values which are any one of the types specified in the CHOICE. At database generation time, therefore, it is not known ahead of time which specific components of the CHOICE will be actually instantiated. Indeed, different object instances may choose to embody different CHOICE components. Thus, if the CHOICE components are of different types, it is difficult to decide which type of column should be created for the CHOICE component.

The current invention solves this problem by essentially treating the CHOICE as a SEQUENCE, and creating columns for each component of the CHOICE (as if it were a fully populated SEQUENCE). Then, depending on the actual component selected for the CHOICE by an object instance, the appropriate field in the record would be populated, and all other fields would be set to NULL. (It is incumbent on the application software to ensure that, for every object instance record, only one column of the CHOICE group is populated at any given time.) This approach not only makes it possible to store every possible embodiment of the CHOICE component, but also makes it possible to identify which such component has been chosen for embodiment by that object instance.

The MIB Schema Compiler, in this stage, acts as a simple translator which essentially translate an object template from one source language (ASN.1 macro notation) to another (SQL). Thus, all commands generated by the MIB Schema Compiler will be of the type "CREATE TABLE...." with the appropriate column definitions for each table. These commands may be sent to the SQL interface of any relational database management system for immediate execution, or may be stored in a file for later execution.

The following subsections describe techniques used in the MIB Schema Compiler for handling more complex cases of object classes.

2.2 Inheritance

In ASN.1 macro notation, object classes may be derived from other object classes, in which case they inherit attributes from their parent class. An example of this is provided above, in which the "processingEntity" Object Class derives from the "equipment" object class.

This implies that there is a "IS-A" relationship between them. (i.e. A processingEntity "IS-A" equipment).

This is handled by the MIB Schema Compiler also references. The identifying attribute column, which was created for the parent class, is now replicated as an additional column also in the table for the derived class. This is now used to store a reference to the instance of the superclass which the current instance in the subclass derives from. Thus, this column will contain the same value as the appropriate record in the schema for the parent class, which can then be used to perform a relational "join" between the two tables. This preserves the concept of inheritance whereby every element of a derived class automatically inherits all attributes of its parent class.

Note that this is only done for classes which have a class other than "top" as a superclass. Classes that derive only from top are not considered subclasses of any other class, and hence the column created to hold the instance identifier is not considered a reference-to-parent column. Note also there is no table corresponding to the "top" managed object class.

For example, when translating the Object Class macro for "processingEntity" as defined above, the MIB Schema Compiler will introduce the column "equipmentID" in the table for the "processingEntity", even though the definition of "processingEntity" does not explicitly define such an attribute. However, because the "processingEntity" derives from "equipment", and because "equipmentID" is the naming attribute for all instances of "equipment", the "processingEntity" class automatically inherits this attribute as its own naming attribute as well. Further, since this is a naming attribute, it is guaranteed to be unique among all instances of equipment, and hence can be used as a join from the processing Entity table into the equipment table.

Thus, the record for a given instance of processingEntity is split over two tables—attributes directly defined for the "processingEntity" class are stored in its own table, while attributes inherited from "equipment" are stored in the equipment table. The equipmentID column, which is present in both tables, contains the same value in either table, and serves as the join column to tie the records together. This allows the reconstruction of the complete instance of a processingEntity.

The same technique is used for further derived subclasses. For example, if a "workstation" were to be a derived subclass of "processingEntity", it may need to possess additional attributes which an ordinary instance of "processingEntity" may not. It would then store these values in columns in the "workstation" table. However, the "workstation" table would also contain an "equipmentID" column (which it inherited as a naming attribute) which would serve to tie together the record for a given instance of a workstation, which is now distributed over all three tables—"equipment", "processingEntity" and "workstation".

2.3 Multiple Inheritance

Multiple inheritance—in which an Object Class may inherit attributes from more than one parent class—is easily handled in the MIB Schema Compiler by creating one naming attribute as a reference into the table for each parent Object Class. For the purposes of persistent storage of objects this is merely an extension of the reference-to-parent implementation in the MIB Schema Compiler and does not represent any conceptual difficulty, and hence we omit any example.

2.4 View Creation

For derived classes, as well as for classes that contain other group and structured attributes, the schema can be augmented for convenience with the creation of appropriate views, such that all references into parent and attribute tables are automatically resolved, giving the appearance of a single, cohesive entity. This provides the flexibility of retrieving the entire leaf class object merely by selecting from the view, which internally performs the joins the resolve the references to its parent and its attribute classes.

The SQL command to create views such as the above can be automatically generated by the MIB Schema Compiler during the parsing phase, as the parameters of the above command (table names, join column names) have already been determined by the MIB Schema Compiler by recognizing the Object Class structures and its position in the hierarchy.

3. Name Bindings: The Containment Hierarchy

The above discussion has concentrated on the processing of M-OBJECT-CLASS, GROUP ATTRIBUTE and ATTRIBUTE macros by the MIB Schema Compiler. Another important class of ASN.1 macros are the NAME BINDINGS, which serve two purposes:

1. They specify the naming attributes used to uniquely identify instances of object classes.
2. They specify the containment hierarchy, i.e. dictate which object instances can be part of which other object instances.

An example of a name binding might be:

```
equipment-nb-3    NAME BINDING
    OBJECT CLASS equipment
    IS NAMED BY network
    WITH ATTRIBUTES {equipmentID}
    ::= {forum-nameBinding 33}
```

This indicates that the equipmentID may be used as the naming attribute of an equipment instance, when such an instance is contained within a network instance. For the MIB schema compiler, this is useful in two ways. First, since a NAME BINDING defines a naming attribute which must be unique, this suggests that a UNIQUE INDEX be created on the column which corresponds to this attribute, in the table for the named Object Class. (As explained above, the naming column will typically contain a mapped or encoded representation of the actual naming attribute.) This is what the MIB Schema Compiler does: for every NAME BINDING processed, it examines whether a UNIQUE INDEX already exists on the column corresponding to the naming attribute in the table corresponding to the named class. If not, it issues a "CREATE UNIQUE INDEX" SQL command to generate such a unique index.

Second, it allows the MIB Schema compiler to create a containment hierarchy of object instances. Two approaches may be specified for such a relational mapping of a containment hierarchy. In the first approach, a single table holds all the containment relationships for a given network. Such a table would look like:

TABLE 8
CONTAINMENT HIERARCHY TABLE

| ContainingClass | ContainingInstance | ContainedClass | ContainedInstance |
| --- | --- | --- | --- |

Thus, for every instance of a containment relationship, a record would be created in the above table, which would essentially map a tree-structured containment relationship into a relational table. The ContainingClass and ContainedClass columns would identify (either through the textual string for class identifiers used in the Object Macro definition, or using a textual or numerically encoded representation of its corresponding OBJECT IDENTIFIER) the classes participating in that particular instance of containment. The ContainingInstance and ContainedInstance would contain the instance identifier (using either the mapping from the DistinguishedName Mapping table above, or using a direct textually or numerically encoded representation of the Distinguished Name) the specific instances of the containing and contained objects.

The approach taken in the preferred embodiment of the current invention is to construct the table as above, using the textual class identifier name and the numerically mapped instance identifiers from the Distinguished Name mapping table.

An alternative approach, also within the realm of the present invention, is to create a separate table for every name binding encountered. In other words, for the "equipment-nb-3" NAME BINDING specified above, the following table would be created:

TABLE 9
EQUIPMENT-NB-3: NETWORK-EQUIPMENT CONTAINMENT TABLE

| networkInstance | equipmentInstance |
| --- | --- |

Thus, for every instance of equipment contained in every instance of network, there would be one record in the above table. There would be no need to have columns for identifying the class of the containing and contained objects, as this is apparent from the name binding itself, and a separate table would be created for each such name binding encountered.

This approach has the advantage that traversal of the containment hierarchy is implemented as a number of "horizontal" joins through several small two-column tables. In the first approach, traversal would require threading through several entries within a single, large table. However, the second approach has the disadvantage of creating several two-column tables, some of which may be either sparsely populated or never used.

4. Normalization

4.1 Automatic Third-Normal Form

It should be clear from the above description that the schema created by the MIB Schema Compiler of the present invention are "naturally self-normalizing", i.e. due to the use of references both in the case of attribute-domain relationships between classes as well as hierarchy relationships between classes, the resulting schema automatically organizes itself in Third Normal Form. To clarify this concept further, the following table illustrates the mapping used by the MIB Schema Compiler from an object oriented class hierarchy to a traditional relational database design.

TABLE 10

| MIB Definition Construct | Compiler's SQL Schema Mapping |
| --- | --- |
| Managed Object Class | Entity Table |
| Managed Object Instance | Entity Record |
| Simple Attribute | Primitive-Typed Attribute Column |
| Structured Attribute, Unspecified Size | Sequence of Primitive-Typed Columns |
| Structured Attribute, Unspecified Size | Separate Normalized Attribute Mapping Table |
| Multi-Valued Attribute | Separate Normalized Attribute Mapping Table |
| Group Attribute or Conditional Package | Foreign Key into Superclass Table |
| Derived Class | Reference Column into Superclass Table |
| Derived Attribute Retrieval | Join of Records in Superclass/Subclass Tables |

Note further that these concepts can be nested, e.g. a multi-valued attribute may contain complex components which could, in turn, be unspecified size sequences. In all cases, the above mappings are executed in a chained manner, so that isolated group attribute, package attribute or multivalued attribute tables may be further split up depending on their internal composition. Thus the current process may be extended without loss of generality. The resulting database schema will be highly normalized and complex, as it will contain many tables; however, this is merely a reflection of the complex nature of the information constituting the managed object itself.

5. The Class Dictionary

In addition to creating tables which store attribute values for instances of managed object classes, it is also useful to create a "Class Dictionary" which stores static, constant information about the nature of every class, i.e. information which is invariant from instance to instance. Such information would include items such as its position in the class hierarchy, its registered object identifier, operations permitted on it and notifications emitted by it. Note that such information is for reference only, and will never change at run-time once the MIB schema is generated. Nevertheless, it is still useful to have. Runtime applications which require to determine the nature of the class hierarchy and the relationships between them, can do so by querying the Object Dictionary.

The tables generated by the MIB Schema Compiler of the preferred embodiment for the Class Dictionary have the following form:

TABLE 11
OBJECT CLASS HIERARCHY TABLE

| ClassName | DerivedFromClassName | RegisteredObjectIdentifier |
| --- | --- | --- |

The above table stores the name of every Object Class and its Parent Object Class, and a representation of its Object Identifier from the global registration tree. Every class will have exactly one entry in the above table (unless it derives from more than one parent class).

TABLE 12

| OBJECT CLASS OPERATIONS TABLE | |
|---|---|
| ClassName | OperationName |

The above table stores the list of allowed operations (e.g. CREATE, DELETE) on every class. Every class will have as many entries in the above table as there are operations permitted on it, one record for every class-operation pair.

TABLE 13

| OBJECT CLASS NOTIFICATIONS TABLE | |
|---|---|
| ClassName | NotificationName |

The above table stores the list of allowed notifications emitted by every class. Every class will have as many entries in the above table as there are notifications emitted by it, one record for every class-notification pair.

If information about allomorphic behavior for any given object class (specified in the ALLOMORPHIC SETS clause) is available, it is stored in a separate ALLOMORPHS table. This permits applications to determine at runtime which object classes are allomorphic to which others, by querying this table. The preferred structure of this table is as follows:

TABLE 14

| TABLE: ALLOMORPHS | |
|---|---|
| Object Class | Allomorphic_To |
| C1 | C23 |
| C1 | C24 |
| C2 | C20 |

Every class that exhibited allomorphic behavior has entries in this table. The number of entries in this table for a given class would depend on the number of other classes it is allomorphic to. In the above example, Managed Object Class C1 is allomorphic to two other classes (C23 and C24) and thus has two entries in this table, while Managed Object Class C2 is allomorphic only to C20 and thus has only one entry.

6. ISO GDMO Templates

The majority of this description has focused on generating a MIB Schema given the source ASN.1 constructs (M-OBJECT-CLASS, NAME BINDINGS, ATTRIBUTES and GROUP ATTRIBUTES) as defined by the OSI/Network Management Forum. Similar templates have been defined by ISO/IEC. These templates contain similar Managed Object Class information, however, their syntax is different. In spite of the difference in syntax, however, the two standards contain conceptually very similar information. Thus, the output generated by the MIB Schema compiler is not a function of which syntax it processes—it is only a function of the semantic content of the information. It does mean, however, that the MIB Schema compiler needs to recognize two different styles of macro definitions when it processes its input.

To demonstrate this, an example is reproduced below of the ISO/GDMO MANAGED OBJECT CLASS template:

```
{class-label} MANAGED OBJECT CLASS
    [DERIVED FROM {class-label, class-label, ... }]
    [ALLOMORPHIC SET {class-label, class-label, ... }]
    [CHARACTERIZED BY {package-label, package-label,
        ... }]
    [CONDITIONAL PACKAGES {package-label} PRESENT
        IF {condition},
            {package-label} PRESENT IF {condition},
        ... ]
    [PARAMETERS {parameter-label, parameter-label}]
REGISTERED AS {object identifier};
```

Thus, the attributes for the object are not defined directly inside the OBJECT CLASS macro, but are indirectly defined in the PACKAGE definition. The PACKAGE definition as a whole is placed inside the OBJECT CLASS macro.

The definition for a PACKAGE is as follows:

```
{package-label}    PACKAGE
    [BEHAVIOR DEFINITIONS {behavior-definitions-label}]
    [ATTRIBUTES {attribute-label} propertylist,
        {attribute-label} propertylist,
        ... ]
    [ATTRIBUTE GROUPS {group-label} [{attribute-label},
        ... ]
        {group-label} [{attribute-label}, ... ],
        ... ]
    [ACTIONS {action-label} [{parameter-label}, ... ],
        {action-label} [{parameter-label}, ... ],
        ... ]
    [NOTIFICATIONS {notification-label} [{parameter-label},
        ... ]
        {notification-label} [{parameter-label}, ... ],
        ... ]
[REGISTERED AS {object identifier}]
```

Thus, attributes and attribute groups are specified inside the package definition.

The name binding templates also exhibit a slight syntatic variation:

```
{name-binding-label} NAME BINDING
    SUBORDINATE OBJECT CLASS {class-label}
    NAMED BY SUPERIOR OBJECT CLASS {class-label};
    WITH ATTRIBUTE
        {attribute-label};
    [BEHAVIOR {behavior-definitions-label}, ... ]
    [CREATE {create-modifier}, ... [{parameter-label}]]
    [DELETE {delete-modifier} [{parameter-label}]]
REGISTERED AS {object-identifier};
```

The MIB Schema Compiler can easily parse and process the above templates in a fashion similar to that described above, given the following equivalences:

1. All information not of interest in creating the MIB Schema (e.g. Behavior Definitions, Parameters, Actions, Notifications etc.) is ignored, except as required in the generation of the Object Class Dictionary tables.

2. Name bindings are treated exactly as they are earlier, with the SUBORDINATE OBJECT CLASS clause specifying the contained class, and the SUPERIOR OBJECT CLASS macro specifying the containing class.

3. The core package, which is the package label specified by the CHARACTERIZED BY clause in the MANAGED OBJECT CLASS macro, is treated as if it were the direct attribute set belonging to the object class itself.

4. Attribute Groups specified in the core package are treated as GROUP ATTRIBUTE clauses were treated in the Forum templates (i.e. isolated in a table separate from the Object Class table, with a join-back column).

5. CONDITIONAL PACKAGEs are treated in the same manner (i.e. isolated in a table separate from the Object Class table, with a join-back column). Attribute Groups which are part of conditional packages however, are not further isolated in separate tables, but are stored in the same table as the direct attributes of the conditional package itself.

6. Information about allomorphic behavior for any given object class (specified in the ALLOMORPHIC SETS clause) is stored in a separate ALLOMORPHS table. This is generated as described in the Class Dictionary section earlier With the above equivalences, the ISO GDMO templates can be processed in the same manner as the Forum templates described earlier.

7. Description of the Flow Charts

With the benefit of the above description of the invention, the details of implementing the invention will now be described in conjunction with the flow charts of FIGS. 5-19.

Figure 5:
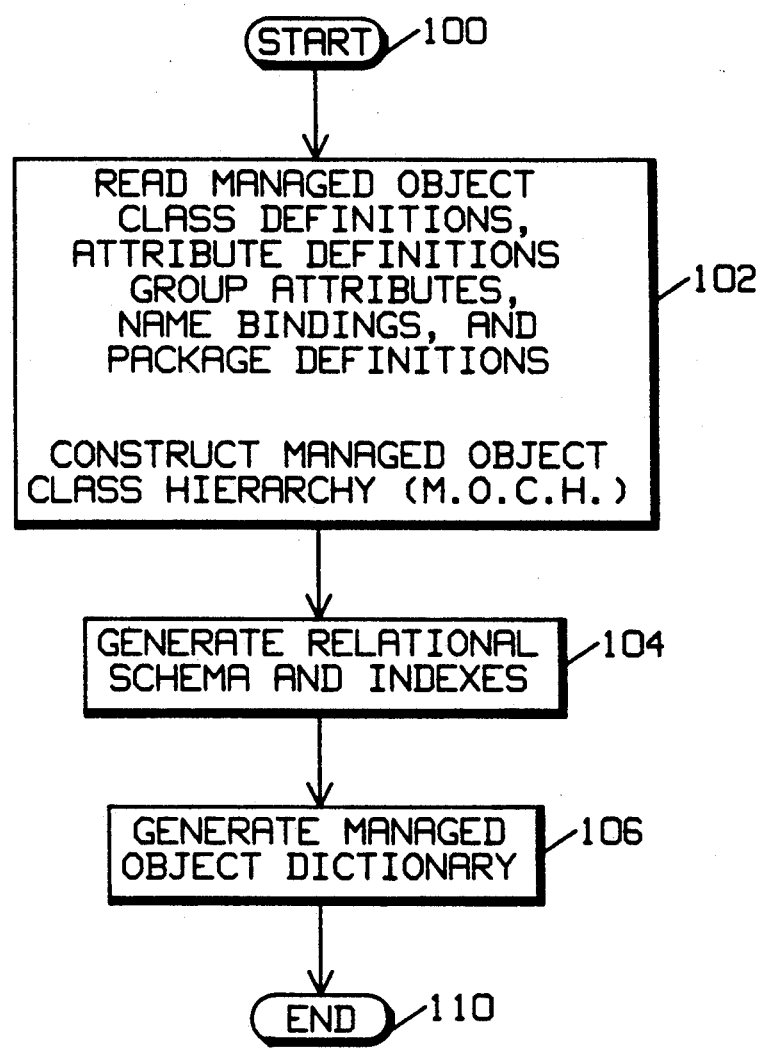
FIG. 5 shows a flow chart of the overall operation of the present invention.

Turning now to FIG. 5, a flow chart of the overall operation of the present invention is shown beginning at step 100. At step 102, translator reads the managed object class definitions, group attributes, name bindings and package definitions, and constructs a managed object class hierarchy (M.O.C.H.). Control then passes to step 104, where the relational schema and indexes are generated. Finally, the managed object dictionary is generated at 106 and the process terminates at 110. This gross process is broken down into more detailed routines to be discussed hereafter.

Figure 6:
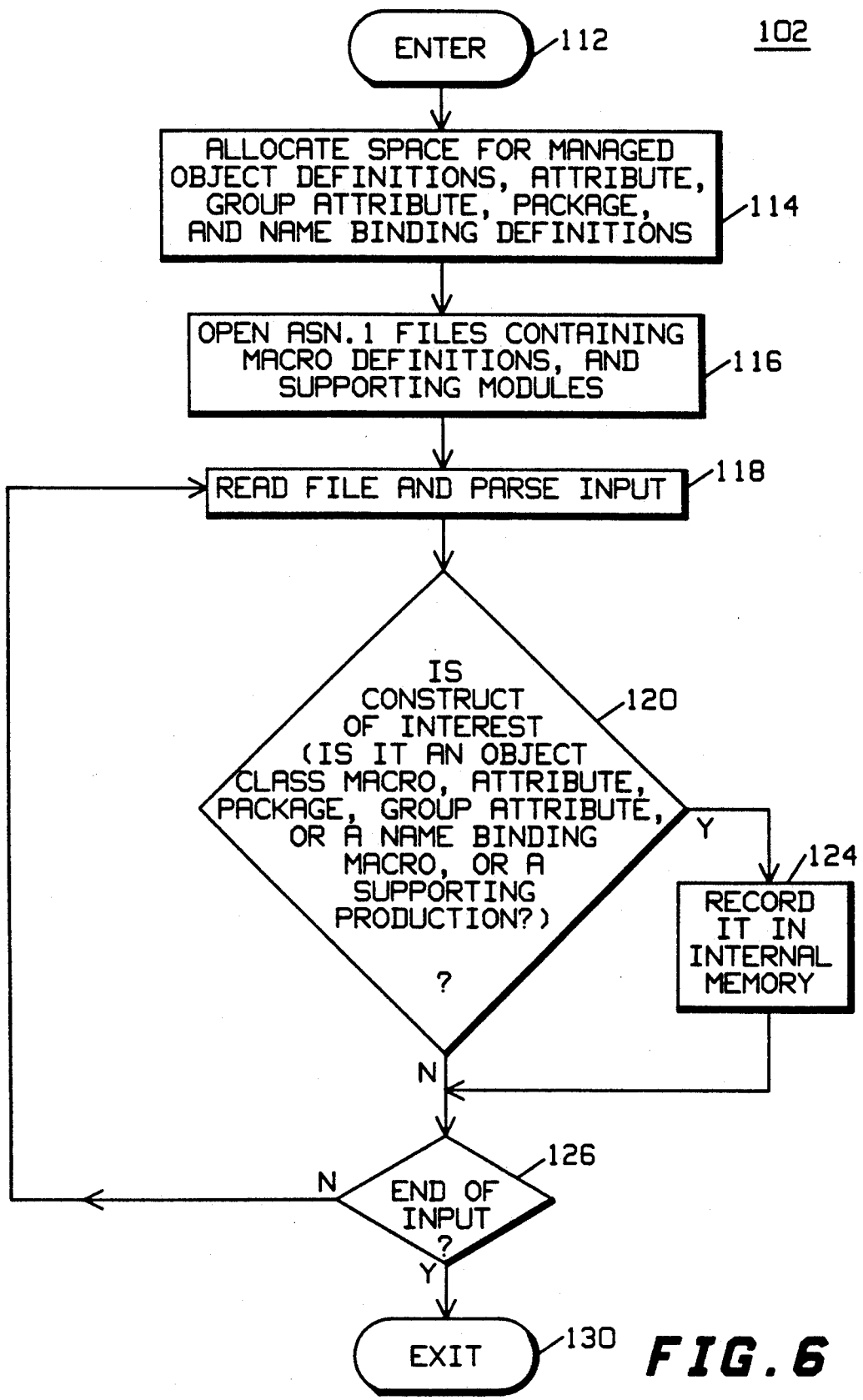
FIG. 6 shows a flow chart of the process of reading ASN.1 macro definitions and constructing the managed object class hierarchy of step 102 of FIG. 5.

Turning now to FIG. 6, the process of reading ASN.1 macro definitions and constructing the managed object class hierarchy step 102 of FIG. 5 is shown in greater detail. This process begins at step 112 and space is allocated for managed object definitions, attribute, group attribute, package and name binding definitions at step 114.

Next, step 116 opens ASN.1 files containing macro definitions and supporting modules. At step 118 the file is read and the input parsed. Control then passes to step 120 where the routine determines if the current input is a construct of interest. That is, it determines if it is an object class macro, an attribute, a package, a group attribute, or a name binding macro, or a supporting production. If so, the construct is recorded in internal memory at step 124 and control passes to step 126. If not, control passes directly from step 120 to step 126. At step 126, the routine determines if the end of the input has been reached. If not, control passes to step 118. If so, the routine exits at step 130.

Figure 7:
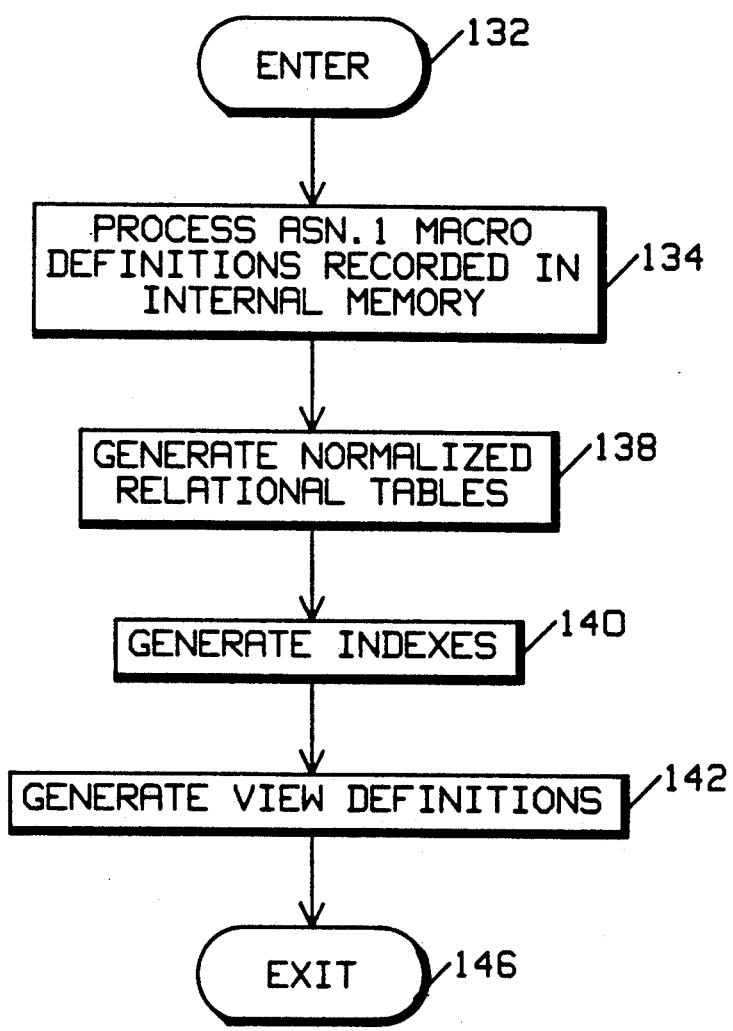
FIG. 7 shows a flow chart of generating the relational schema of step 104 of FIG. 5.

Turning now to FIG. 7, a flow chart of the process of generating the relational schema of step 104 of FIG. 5 is shown in greater detail. This process begins at step 132 after which the ASN.1 macro definitions recorded in internal memory are processed at step 134. Control then passes to step 138 where the normalized relational tables are generated. The indexes are then generated at step 140 and the view definitions are generated at step 142. The routine exits at step 146.

Figure 8:
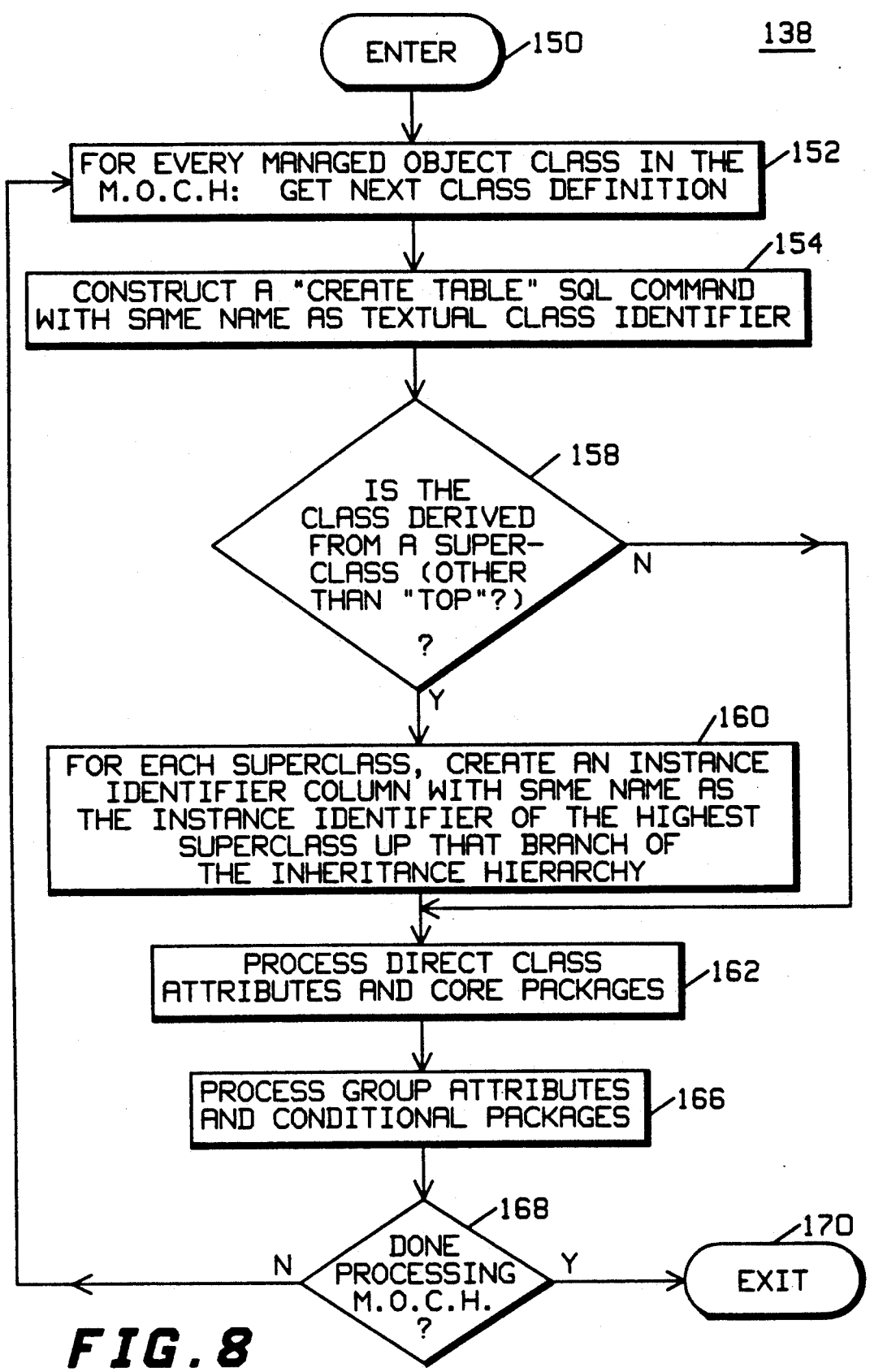
FIG. 8 shows a flow chart of generating normalized relational tables of step 138 of FIG. 7.

The routine for generating normalized relational tables (step 138 of FIG. 7) is expanded in the flow chart of FIG. 8. This routine begins at step 150 after which, in step 152, each class definition is retrieved for every managed object class in the managed object class hierarchy. Next, a CREATE TABLE SQL command is constructed with the same name as the class identifier for the class at hand at step 154. Step 158 then determines if the class is derived from a superclass other than the "top". If so, an instance identifier column is created for each superclass. This instance identifier column has the same name as the instance identifier of the highest superclass up that branch of the inheritance hierarchy at step 160. Control then passes to step 162.

If the class is not derived from a superclass at step 158, control passes directly to step 162, bypassing step 160. At step 162 the direct class attributes and core packages are processed. Control then passes to step 166 where the group attributes and conditional packages are processed. Finally, control passes to 168 which determines whether or not the manages object class hierarchy has been fully processed. If not, the routine returns to step 152. If so, the routine exits at step 170.

Figure 9:
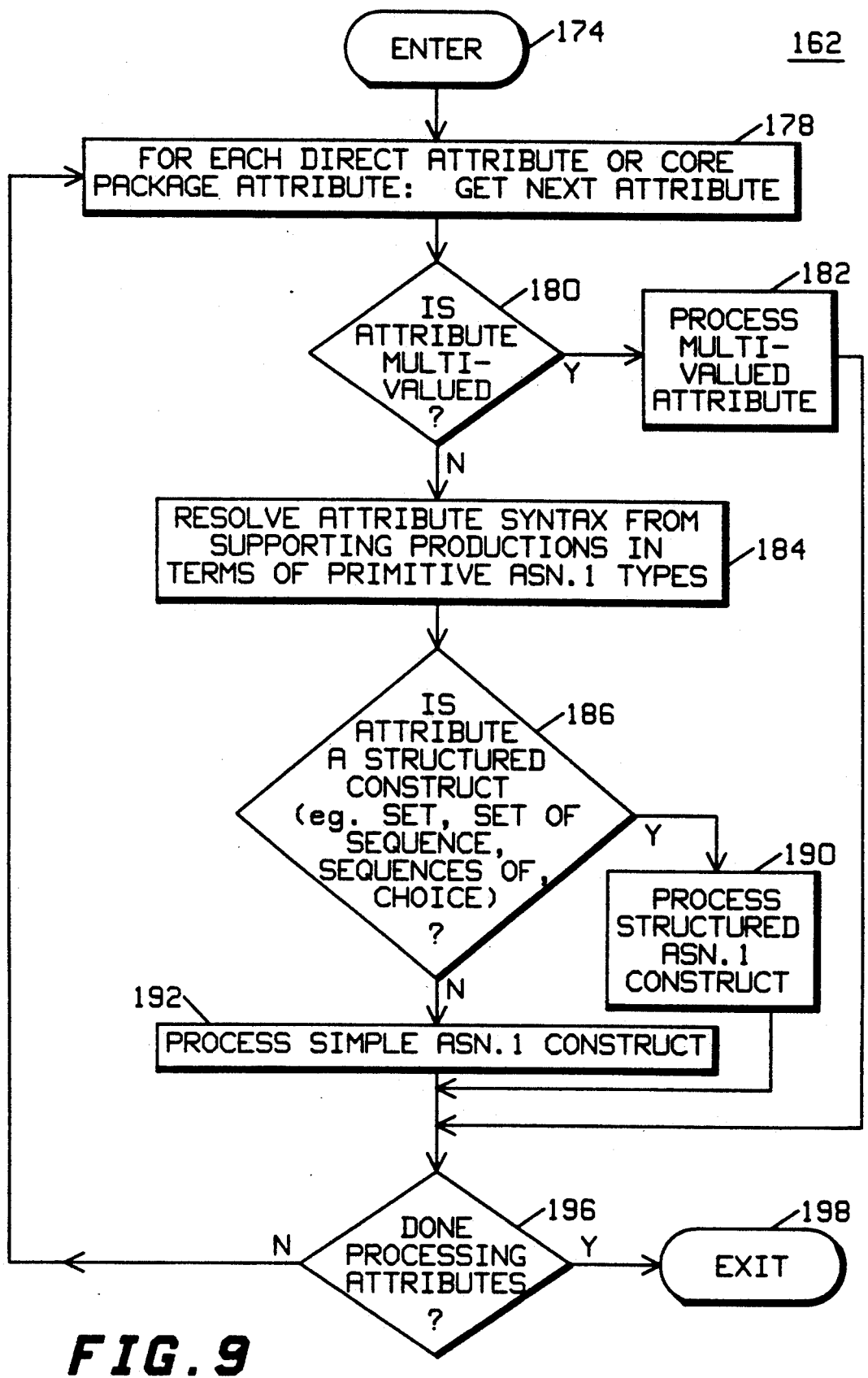
FIG. 9 shows processing direct attributes and core packages of step 162 of FIG. 8.

Turning now to FIG. 9, the routine for processing the direct attributes and core packages, as in step 162 of FIG. 8, is shown in greater detail. This routine begins at step 174 after which each attribute is retrieved for each direct attribute or core package attribute at step 178. If the attribute is multi-valued at step 180, control passes to step 182 where the multi-valued attribute is processed. Control then passes from step 182 to step 196.

If the attribute is not multi-valued at step 180, control passes to 184 where the attribute syntax is resolved from supporting productions in terms of primitive ASN.1 types. Control then passes from 184 to step 186 where the routine determines whether the attribute is a structured construct (that is whether the attribute is a SET, SET OF, SEQUENCE, SEQUENCE OF or CHOICE). If so, the structured ASN.1 construct is processed at step 190. Control then passes from step 190 to step 196. If the attribute is not a structured construct at step 186, control passes to step 192 where the construct is processed a simple ASN.1 construct. Control then passes to 196. Step 196 determines whether or not all attributes have been processed. If not control returns to step 178 where the next attribute is retrieved. If so, the routine exits at step 198.

Figure 10:
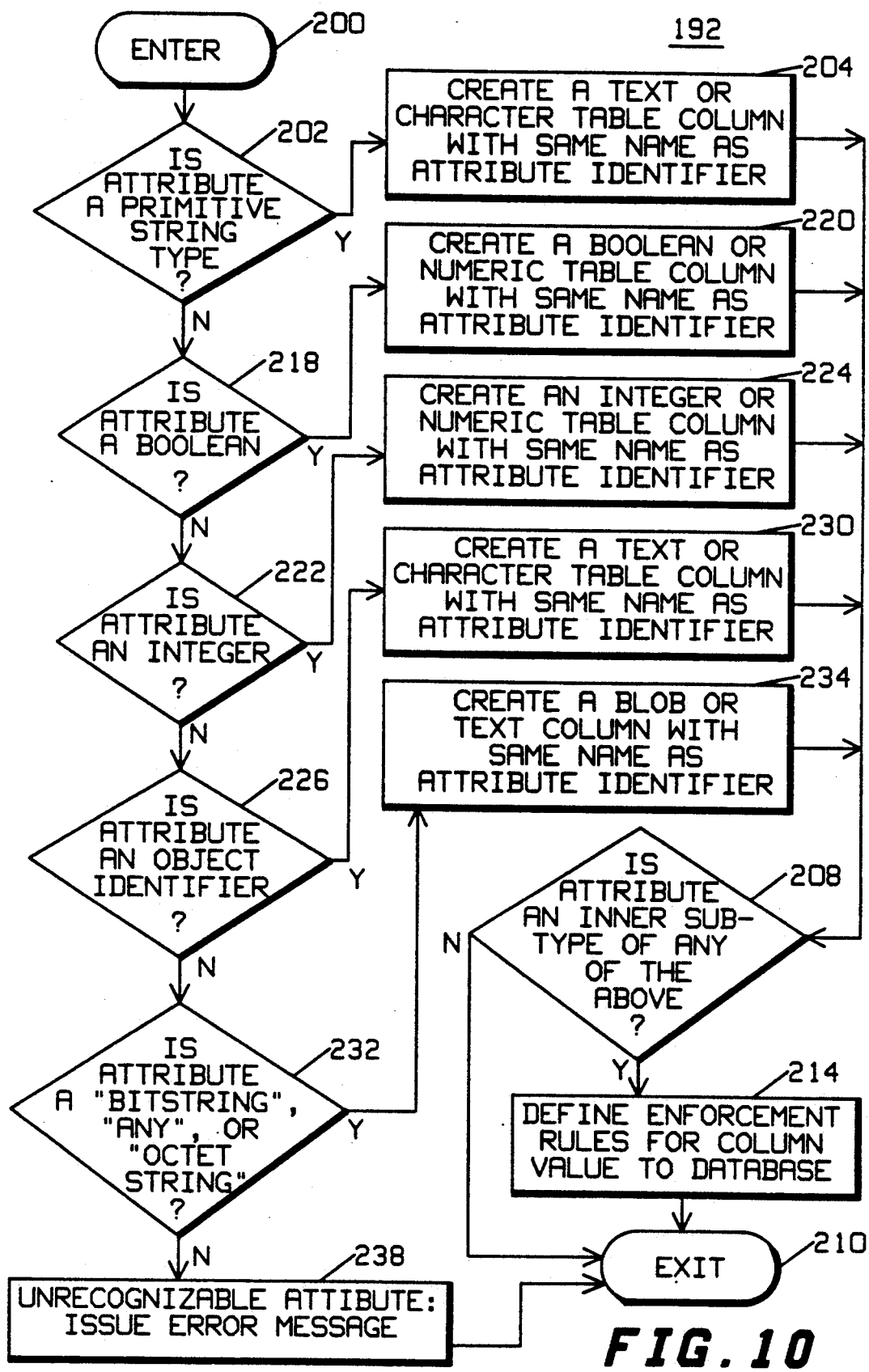
FIG. 10 is a flow chart of processing simple ASN.1 constructs as in step 192 of FIG. 9.

Turning now to FIG. 10, the routine for processing simple ASN.1 constructs (as in step 192 of FIG. 9) is shown in greater detail. This routine begins at step 200 after which step 202 determines whether the attribute at hand is a primitive string type. If so, control passes to step 204 where a text or character table column with the same name as the attribute identifier attribute is created. Control then passes from 204 to 208 which determines if the attribute is an inner subtype of the type it just processed. If not, control passes to step 210 where the routine exits. If so, control passes to step 214 which defines enforcement rules for the column value in the data base. Control then passes from 214 to step 210.

If the attribute is not a primitive string type in step 202, control passes to step 218 which determines whether or not the attribute a boolean type. If so, control passes to 220 where a boolean or numeric table column with the same name of as the attribute identifier is created. Control then passes from 220 to step 208. If the attribute is not a boolean type, control passes to step 222 where the routine determines if the attribute is an integer type. If so, step 224 creates an integer or numeric table column with the same name as the attribute identifier. Control then passes from 224 to step 208.

If at step 222, the attribute is not an integer, control passes to step 226 where the routine determines if the attribute is an object identifier. If so, step 230 creates a text or character table column with the same name as the attribute identifier. Control then passes from 230 to step 208. If step 226 determines that the attribute is not an object identifier, step 232 determines if the attribute is a BIT STRING, ANY or OCTET STRING. If so, step 234 creates a BLOB or text column with the same name as the attribute identifier and control then passes to step 208. If the response to step 232 is negative, control passes to step 238 where the routine determines that an unrecognizable attribute has been encountered and issues an error message. Control then passes to step 210 where the routine exits.

Figure 11:
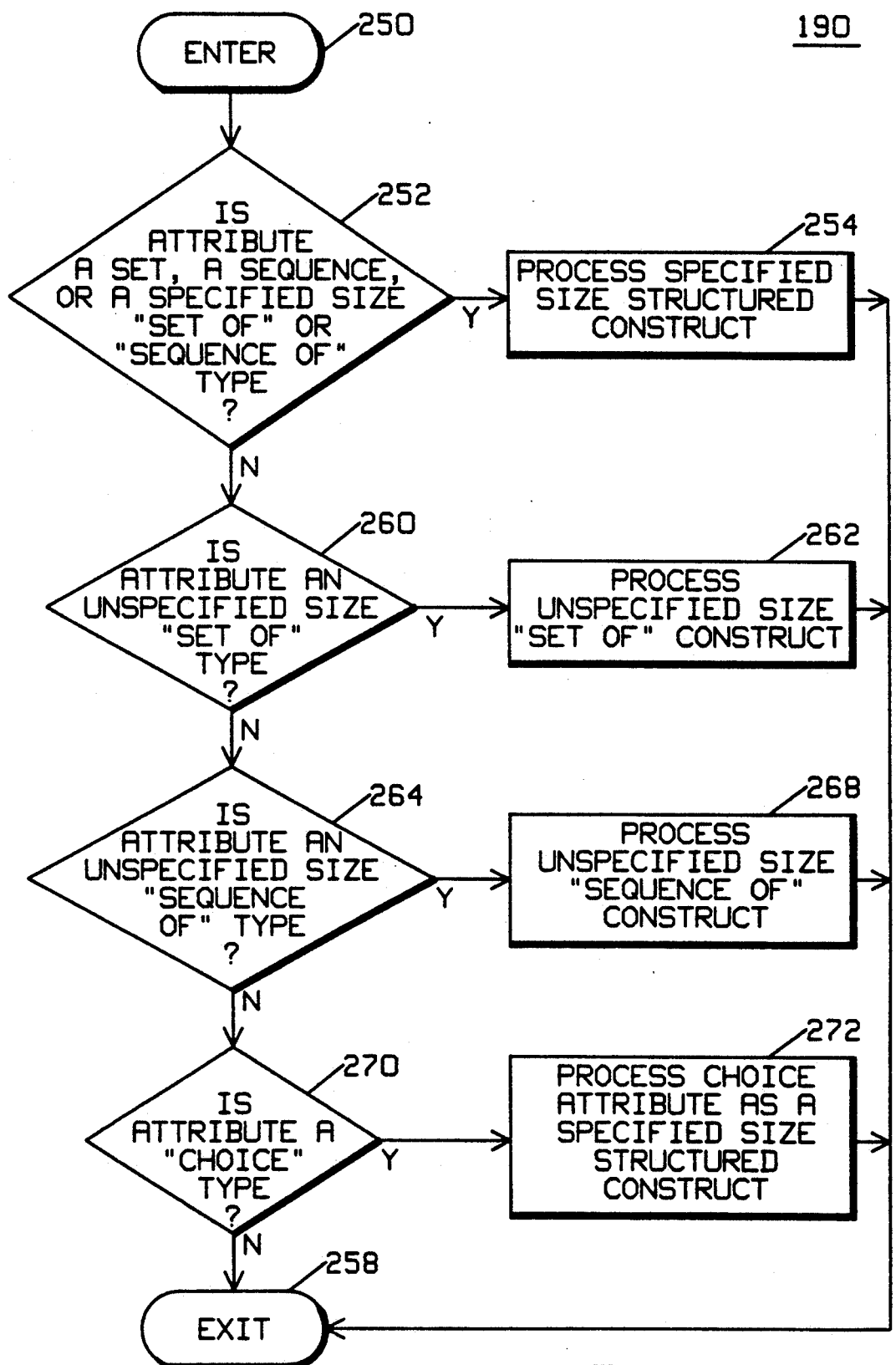
FIG. 11 is a flow chart of processing structured ASN.1 constructs as in step 190 of FIG. 9.

Turning now to FIG. 11, the flow chart of the processing of structured ASN.1 constructs as in step 190 of FIG. 9 is shown. This routine begins at step 250 after which step 252 determines if the attribute is a SET, a SEQUENCE or a specified size SET OF or SEQUENCE OF type. If so, control passes to step 254 where the attribute is processed as a specified size structured construct as 254. Control then passes to step 258 where the routine exits. If step 252 results in a negative response, control passes to step 260 where the routine determines if the attribute is an unspecified size SET OF type. If so, step 262 process an unspecified size SET OF construct. Control then passes to 258. If the answer in step 260 is negative, control passes to step 264 where the routine determines if the attribute is an unspecified size SEQUENCE OF type. If so, control passes to 268 where the attribute is processed as an unspecified size SEQUENCE OF construct. Control then passes to step 258. If the answer is negative at step 264, control passes to 270 where the routine determines if the attribute is a CHOICE. If not, control passes to step 258 where the routine exits. If so, control passes to step 272 where the attribute is processes as a specified size structured construct. Control then passes to step 258 where the routine exits.

Figure 12:
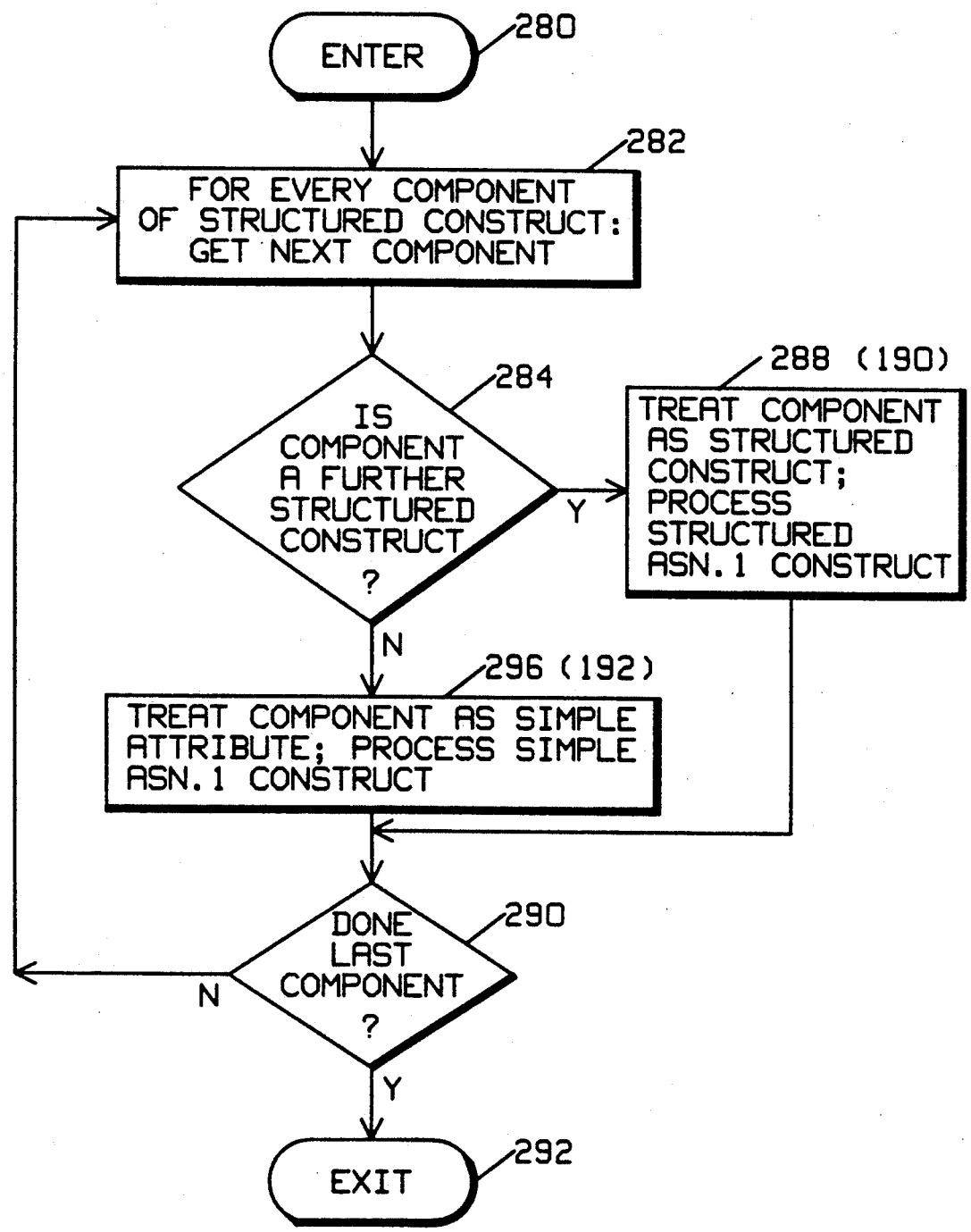
FIG. 12 is a flow chart of the processing of specified size structured constructs as in step 254 of FIG. 11.

Turning now to FIG. 12, the process for processing specified size structured constructs as in step 254 of FIG. 11 is shown in greater detail beginning at step 280. At step 282, each component of the structured construct is sequentially retrieved and processed by the remainder of the routine. At step 284, the routine determines if the component is a further structured construct. If so, control passes to 288 where the component is treated as a structured construct and processed as a structured ASN.1 construct. Note that this could be a recursive call to the "Process Structured ASN.1 Construct" routine, since step 288 is the same as step 190, and 288 is called from 254 which is called from 190 itself. Control then passes from 288 to 290. If the component is not a further structured construct at step 284, control passes to 296 where the component is treated as a simple attribute and processed as a simple ASN.1 construct. Note that step 296 is the same as step 192. Control then passes to step 290 which determines if the last component has been processed. If not, control returns to step 282 where the next component is retrieved. If so, the routine exits at step 292.

Figure 13:
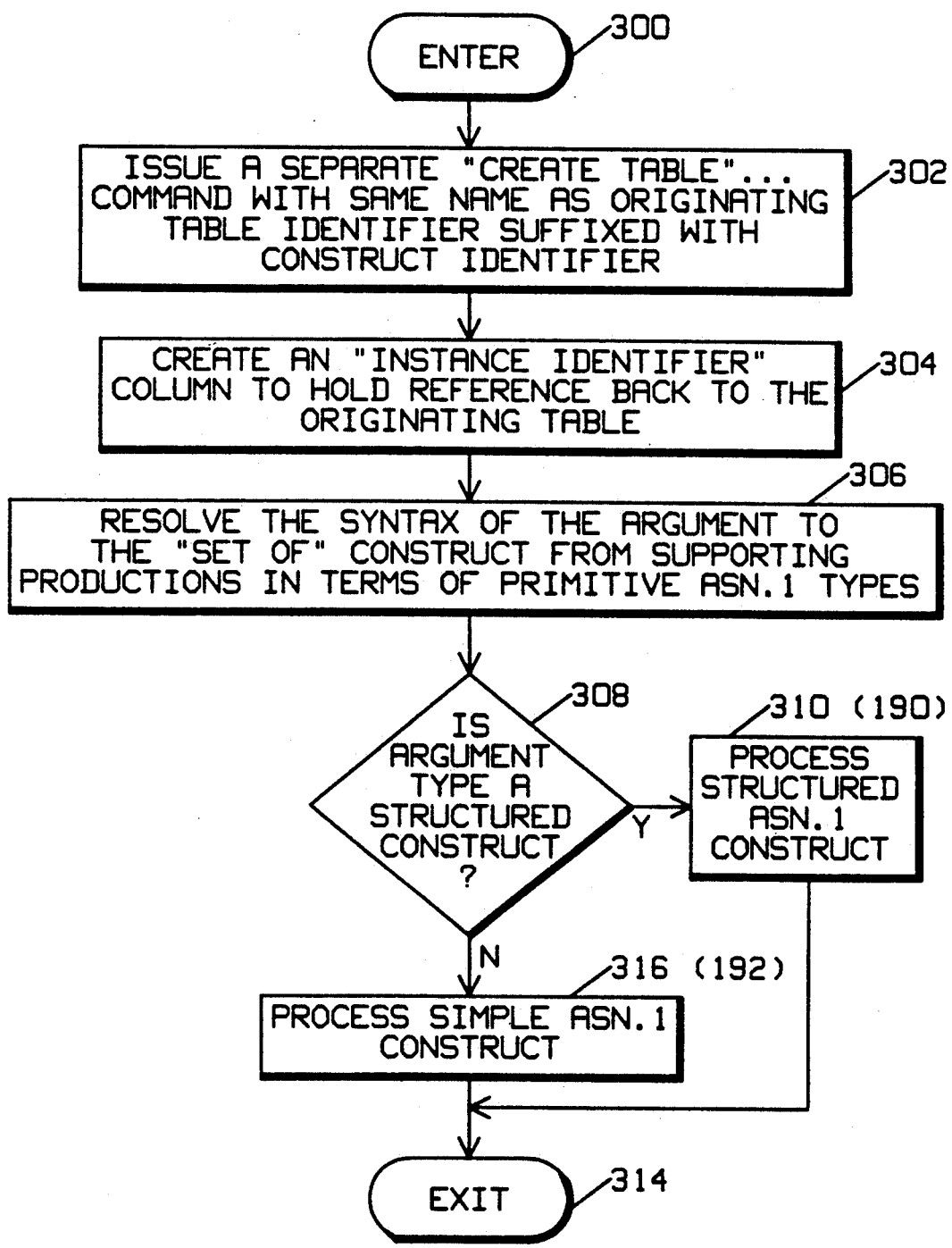
FIG. 13 is a flow chart of the processing of unspecified size "set of" constructs as in step 262 of FIG. 11.

Turning now to FIG. 13, the routine for processing unspecified size SET OF constructs as in step 262 of FIG. 11 is described in greater detail. The routine begins at step 300 after which a separate CREATE TABLE command is issued with the same name as the originating table identifier suffixed with the construct identifier at step 302. Control then passes to step 304 where the routine creates an "instance identifier" column to hold the reference back to the originating table. Control then passes to step 306 which resolves the syntax of the argument to the SET OF construct from supporting productions in terms of primitive ASN.1 types. Control then passes to step 308 which determines if the argument type is a structured construct. If so, control passes to step 310 (same as 190) which processes it as a structured ASN.1 construct. Control then passes to step 314 with routine exits. If the argument type in step 308 is not a structured construct, control passes to 316 (same as 192) which processes the argument as a simple ASN.1 construct. The routine then exits at step 314.

Figure 14:
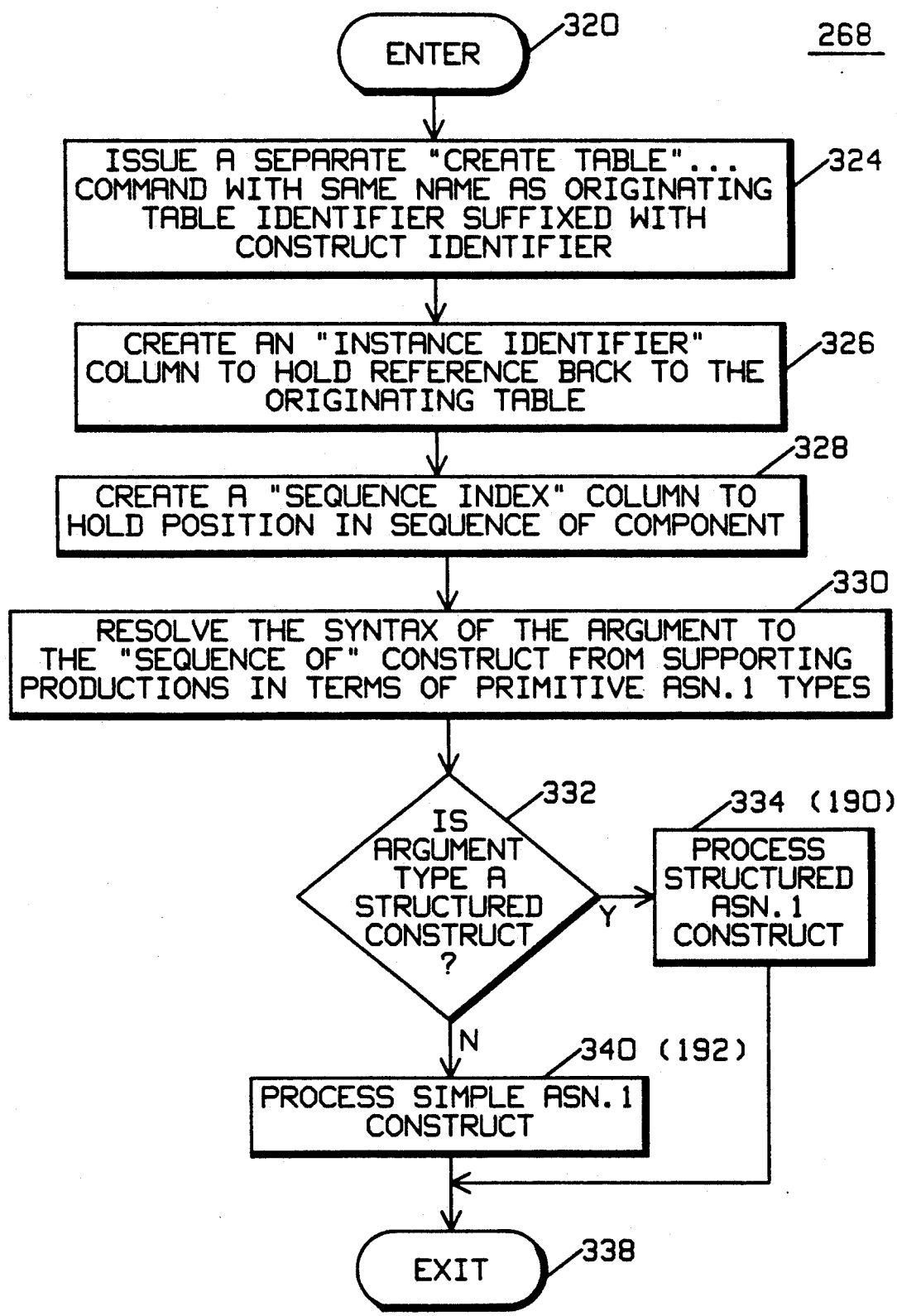
FIG. 14 is a flow chart of the processing of unspecified size "sequence of" constructs as in step 268 of FIG. 11.

Turning now to FIG. 14, the routine for processing of unspecified size SEQUENCE OF constructs (as in step 268 of FIGURE 11) is described in greater detail beginning at 320. At step 324, the routine issues a separate CREATE TABLE command with the same name as the originating table identifier suffixed with the construct identifier. Control then passes to step 326 where an "instance identifier" column is created to hold the reference back to the originating table. Control then passes to 328 which a "sequence index" column to hold position in the sequence of the component. Next, at step 330, the routine resolves the syntax of the argument to the SEQUENCE OF construct from supporting productions in terms of primitive ASN.1 types. Control then passes to step 332 where the routine determines if the argument type is a structured construct. If so, it is processed as a structured ASN.1 construct at step 334 (same as 190). The routine then exits at step 338. If the argument type is not structured construct at step 332, control passes to step 340 (same as 192) where the argument is processed as a simple ASN.1 construct. The routine then exits at step 338.

Figure 15:
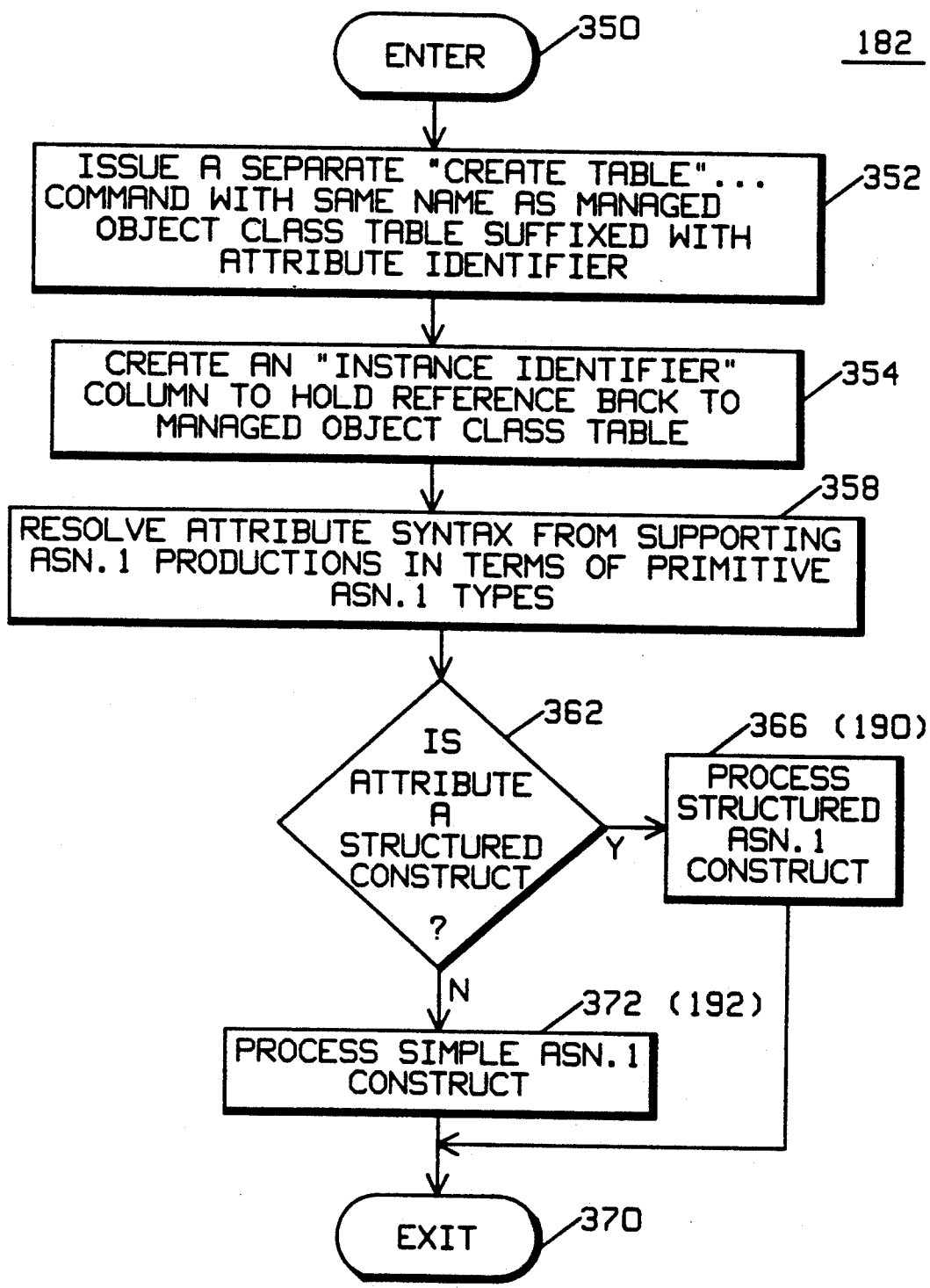
FIG. 15 is a flow chart of processing multi-valued attributes as in step 182 of FIG. 9.

The routine for processing multi-valued attributes as in step 182 of FIG. 9 is shown in greater detail in FIG. 15. This routine begins at step 350 after which the routine issues a separate CREATE TABLE command with the same name as the managed object class table suffixed with the attribute identifier at step 352. Control then passes to step 354 where the routine creates an "instance identifier" column to hold the reference back to the managed object class table. The routine then resolves the attribute syntax from supporting ASN.1 productions in terms of primitive ASN.1 types at step 358. Next, at step 362, the routine determines if the attribute is a structured construct. If so, it is processed at step 366 (same as 190) as a structured ASN.1 construct. Control then passes from step 366 to 370 where the routine exits. If the attribute is not a structured construct at 362, control passes to 372 where it is processed as a simple ASN.1 construct (same as 192). Control then passes to 370 where the routine exits.

Figure 16A:
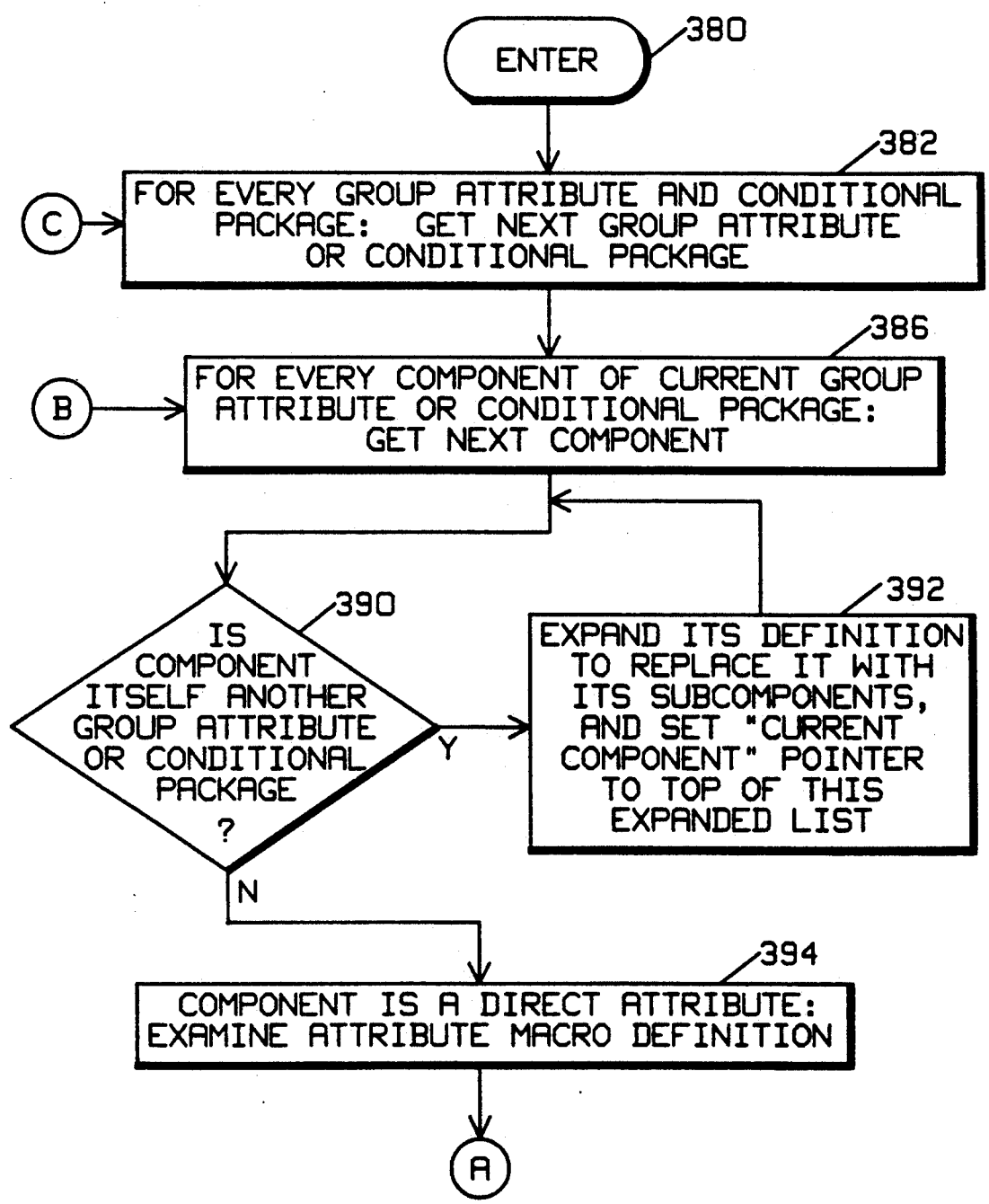
FIG. 16 which is shown divided into two sheets labeled 16A and 16B, is a flow chart of processing group attributes and conditional packages as in step 166 of FIG. 8.
Figure 16B:
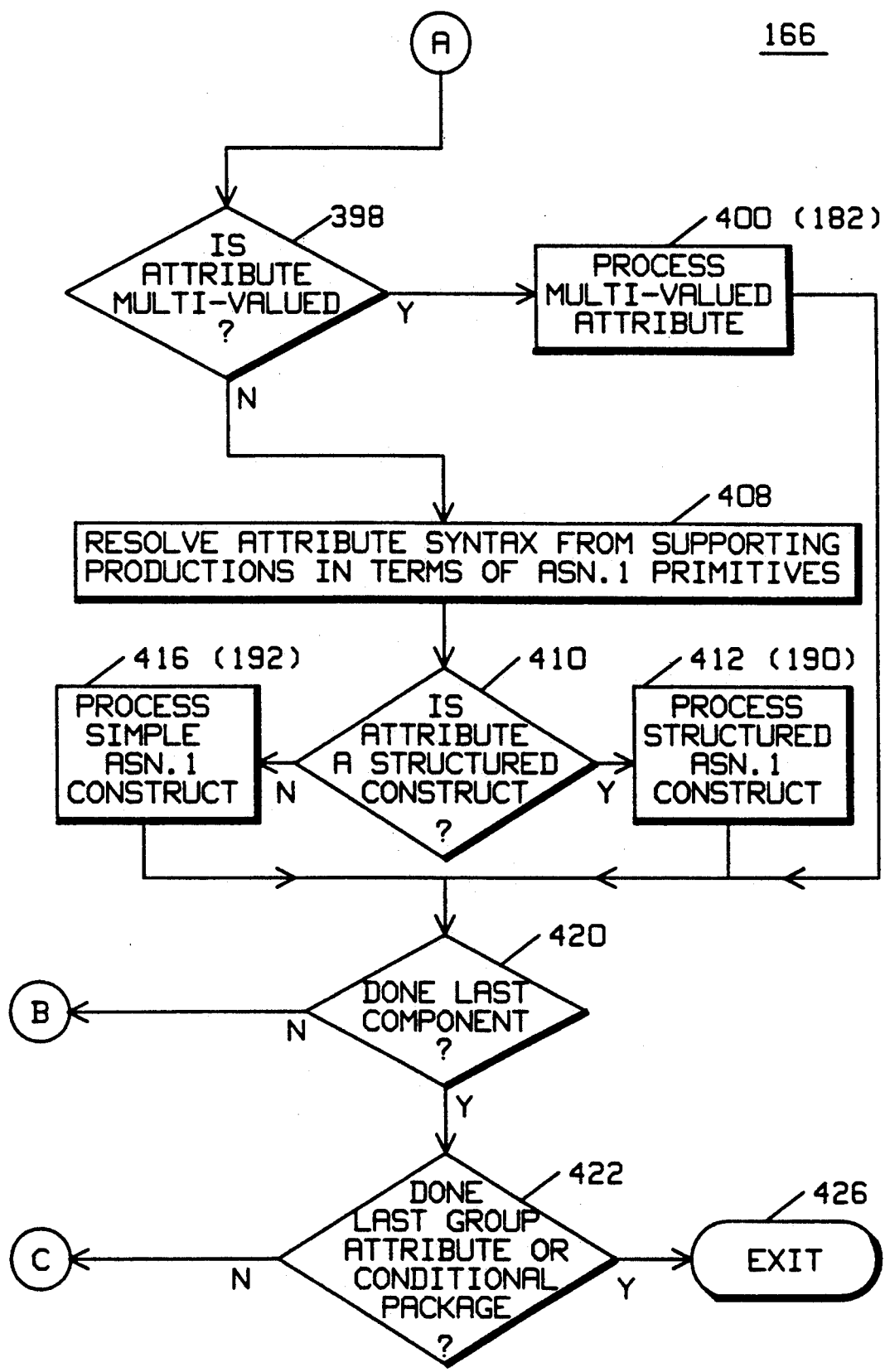

Referring now to FIG. 16A and FIG. 16B, the routine for processing group attributes and conditional packages as in step 166 of FIG. 8 is shown in greater detail beginning at step 380. In this routine, a pair of nested loops operates on each component of each group attribute or conditional package. At step 382, each group attribute or conditional package is successfully retrieved. At step 386, each component of the current group attribute or conditional packages successively retrieved for processing. Control then passes to step 390 which determines if the component itself is another group attribute or conditional package. If so, the routine passes control to step 392 which expands its definition to replace it with its subcomponents and sets the "current component" pointer to the top of this expanded list. Control then passes from 392 back to step 390.

If the component is not another group attribute or conditional package at step 390 then the component is a direct attribute and its attribute macro definition is examined at step 394. Control then passes to step 398 where the routine determines if the attribute is multi-valued. If so, it is processed as a multi-valued attribute at step 400 (same as 182). Control then passes from step 400 to step 420. If the attribute is not multi-valued at step 398, control passes to step 408 which resolves the attribute syntax from supporting productions in terms of ASN.1 primitives. Step 410 then determines if the attribute is a structured construct. If so, control passes to 412 (same as 190) which processes the attribute as a structured ASN.1 construct. If not, control passes to 416 (same as 192) which processes the attribute as a simple ASN.1 construct.

In either event, control passes from 412 or 416 to step 420. Step 420 determines if the last component has been processed. If not, control returns to step 386 where the next component is retrieved. If so, control passes to step 422 which determines if the last group attribute or conditional package has been processed. If not, it returns control to step 382 to retrieve the next group attribute or conditional package. If so, the routine exits at step 426.

Figure 17:
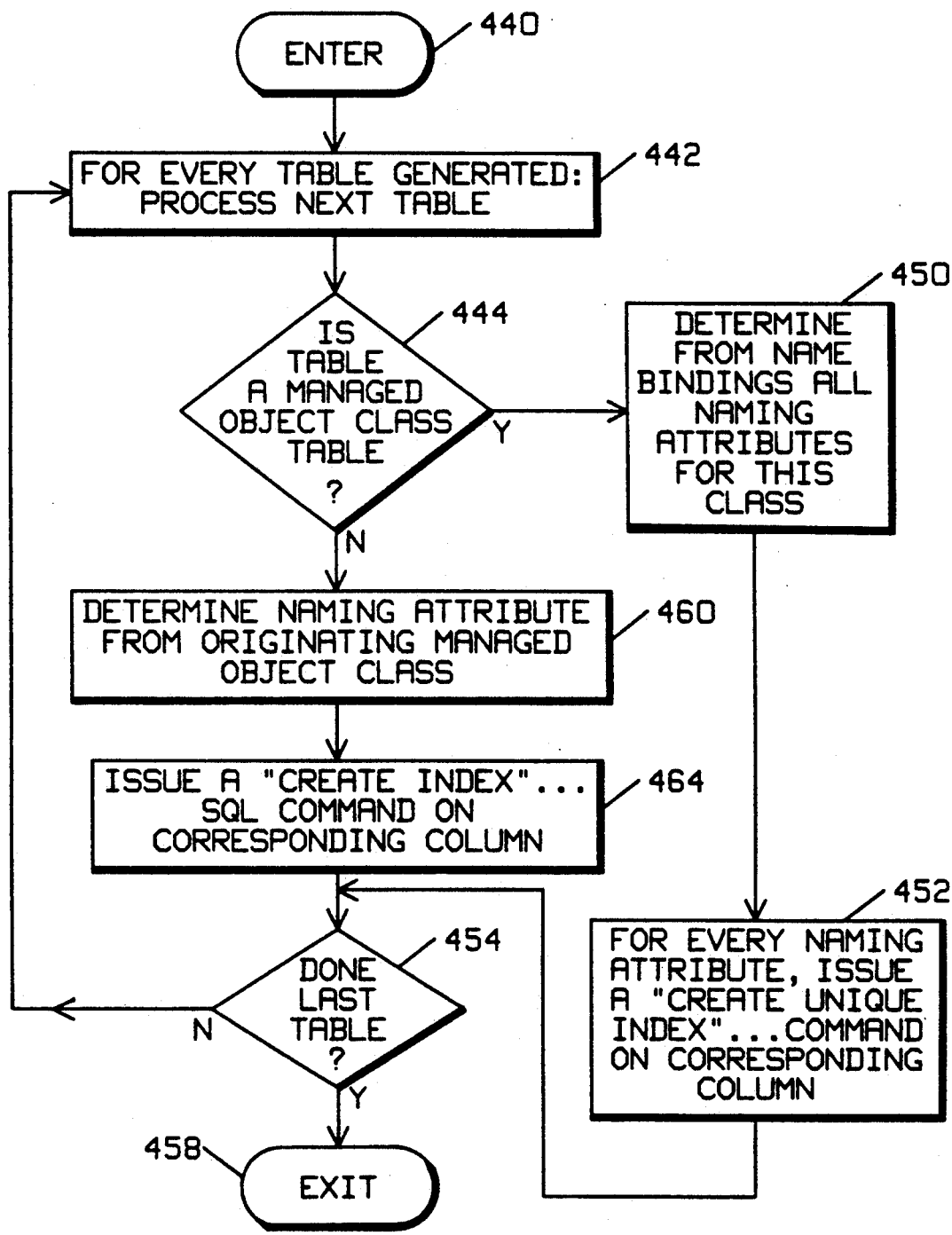
FIG. 17 is a flow chart of the process of generating indexes of step 140 of FIG. 7.

Turning now to FIG. 17, the process of generating indexes of step 140 of FIG. 7 if expanded. This routine enters at step 440 and at step 442 each generated table is successfully retrieved for processing by the remainder of the routine. At step 444 the routine determines if the table is a managed object class table. If so, the routine determines at step 450 from the name bindings all of the naming attributes for this class. Control then passes to step 452 where for every naming attribute, the routine issues a CREATE UNIQUE INDEX command in the corresponding column. Control then passes from step 452 to step 454.

If the table is not a managed object class table at step 444, control passes to 460. Step 460 determines the naming attribute from the originating managed object class and then passes control to step 464. At step 464, the routine issues a CREATE INDEX SQL command on the corresponding column. Control then passes to step 454 which determines whether or not the last table has been processed. If not, control returns to step 442 where the next table is retrieved. If so, the routine exits at step 458.

Figure 18:
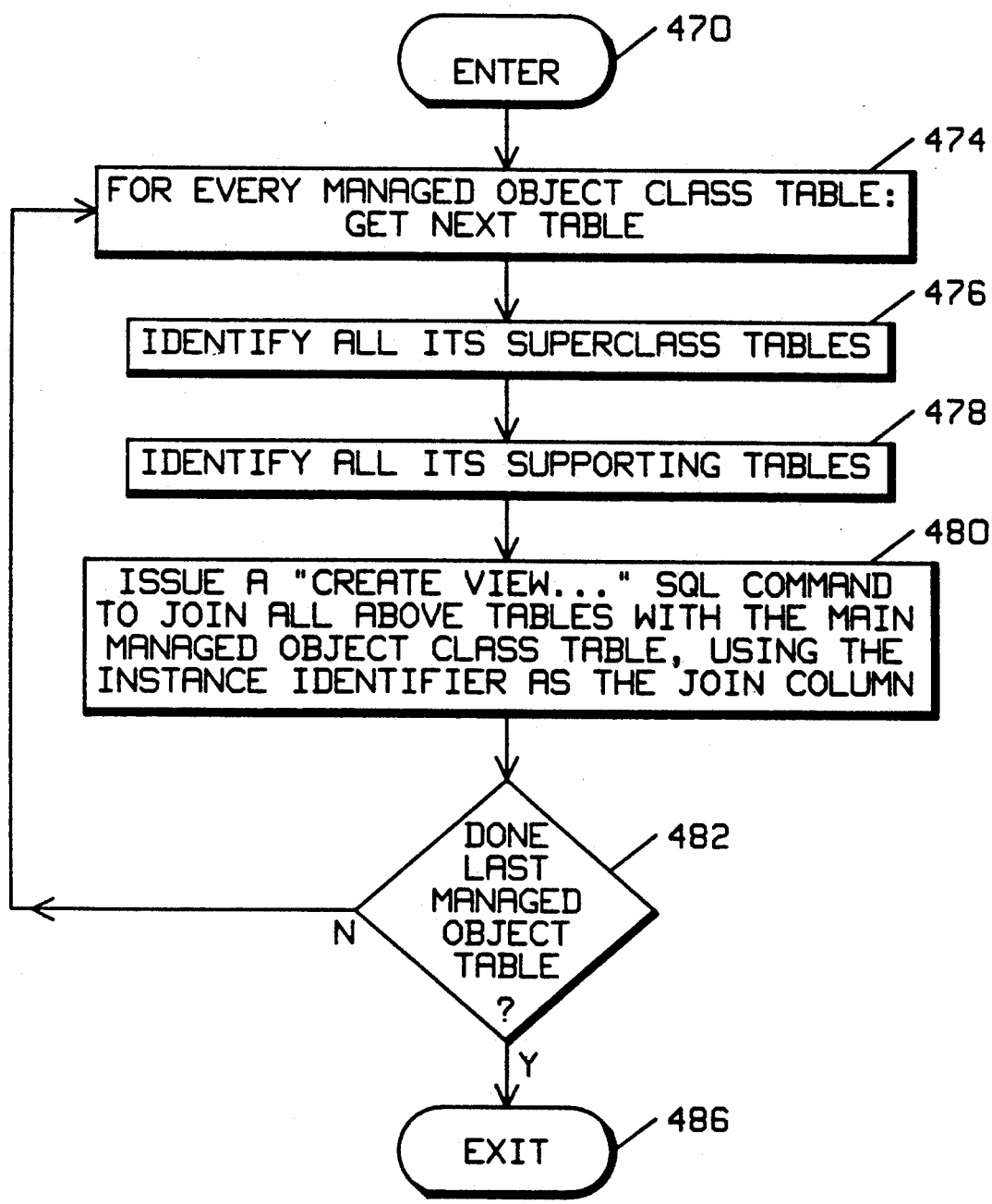
FIG. 18 is a flow chart of the process of generating view definitions of step 142 of FIG. 7.

Turning now to FIG. 18, the routine for generating view definitions as in step 142 of FIG. 7 is shown in greater detail beginning at step 470. At step 474, each managed object class table is successfully retrieved for processing by the remainder of the routine. At step 476, each of the superclass tables for the current object class table is identified and control passes to step 478 which identifies all supporting tables of the current class table. Control then passes to step 480 where the routine issues a CREATE VIEW SQL command to join all of the above tables with the main managed object class table using the instance identifier as the join column. Control then passes to step 482 which determines whether or not the last managed object table has been processed. If not, control returns to step 474 where the next table is retrieved for processing. If so, the routine exits at step 486.

Figure 19:
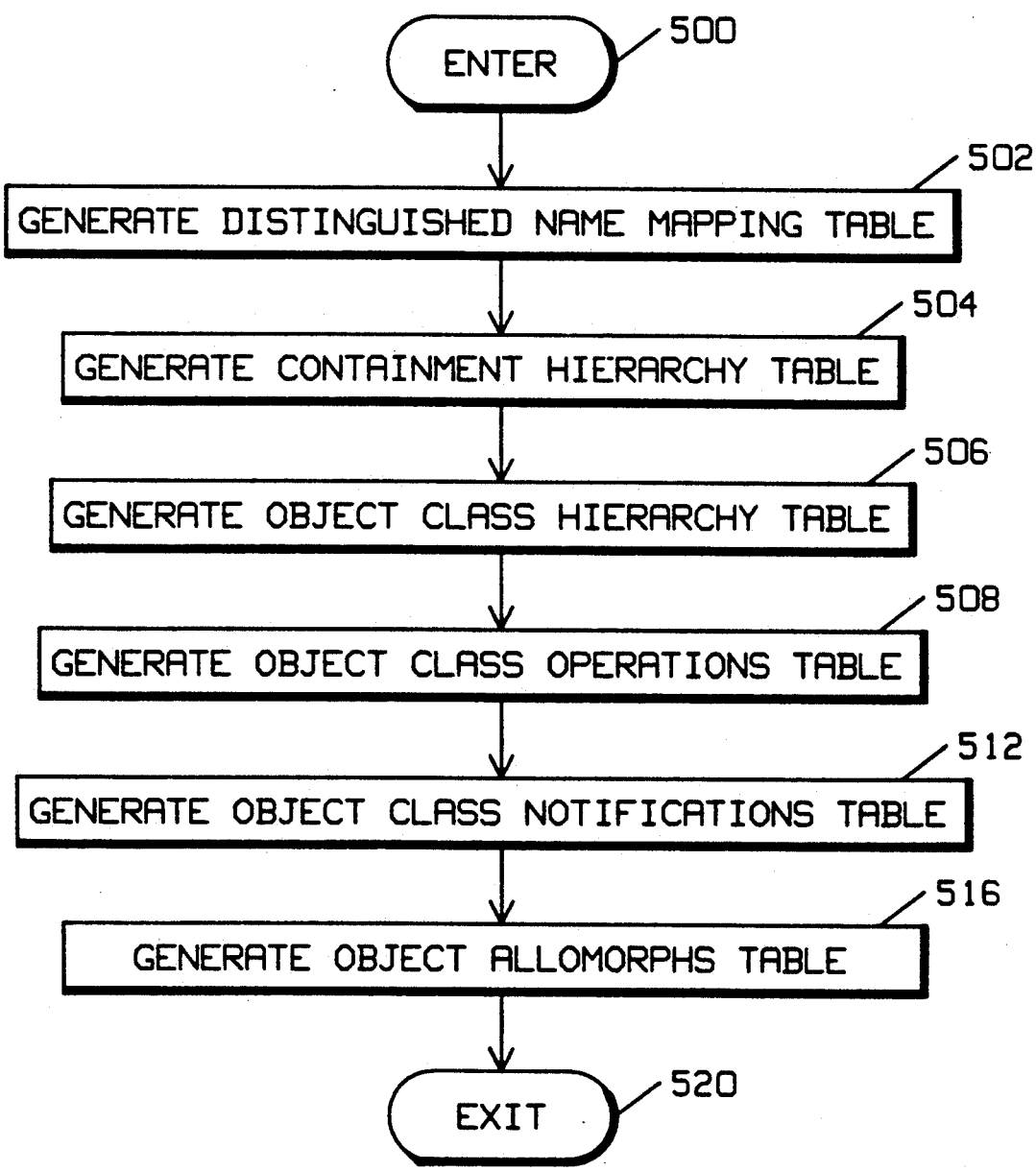
FIG. 19 is a flow chart of the process of generating the managed object class dictionary of step 106 of FIG. 5.

Turning now to FIG. 19, the process for generating the managed object class dictionary of step 106 of FIG. 5 is described in greater detail beginning at step 500. Step 500 passes control to step 502 which generates a distinguished name mapping table. Control then passes to 504 which generates a containment hierarchy table. Next, at step 506, the routine generates an object class hierarchy table. At step 508, the routine generates an object class operations table. Control then passes to 512 which generates an object class notifications table. Finally control passes to step 516 which generates an object allomorphs table. Step 516 then passes control to step 520 where the routine exits. All of these tables are simple tables with a fixed number of columns and they have no sub-tables which need joining into. Their detailed structures have been described earlier. Those skilled in the art will appreciate that the order of steps in the routine of FIG. 19 can be rearranged without departing from the present invention.

8. Hardware Description

Figure 20:
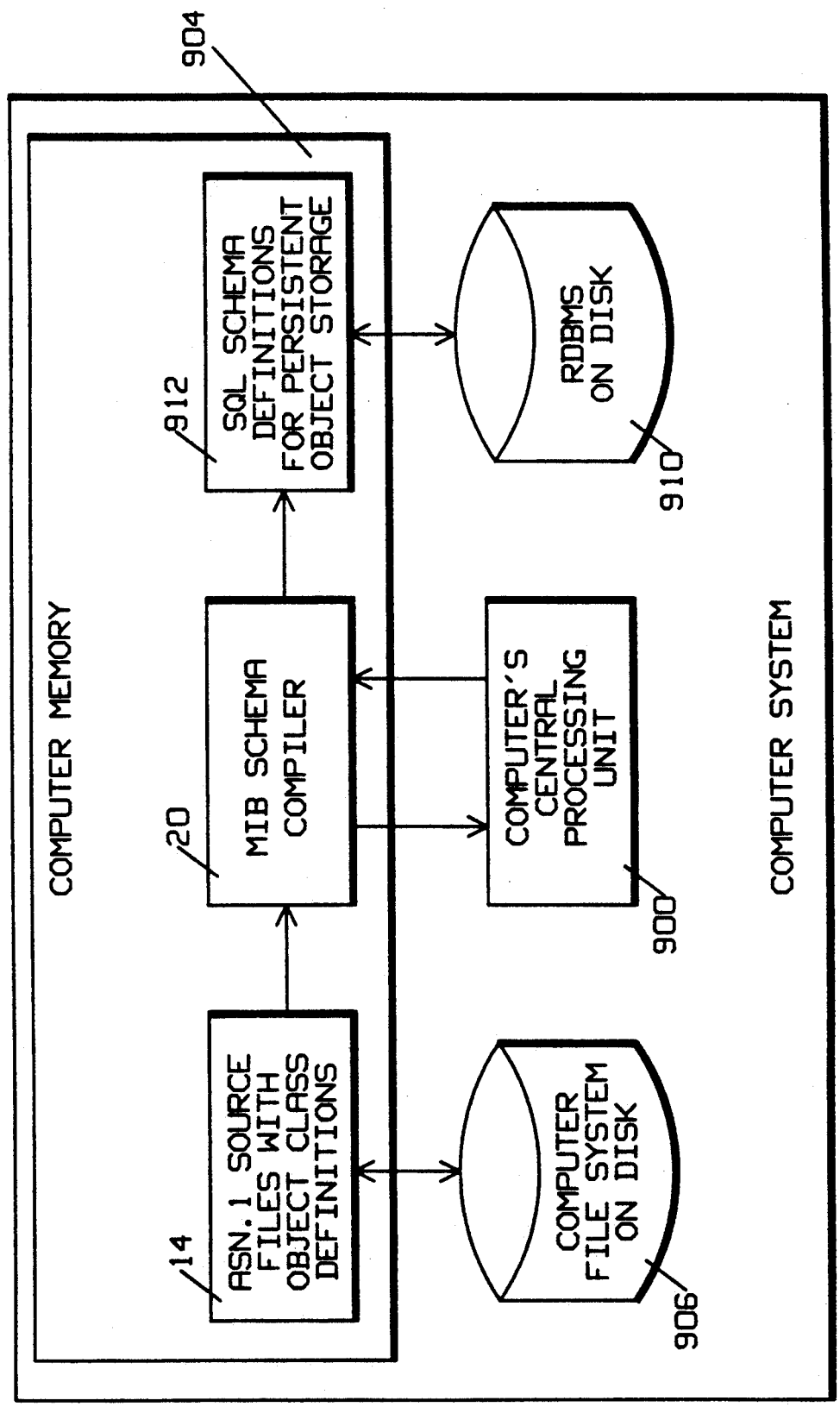
FIG. 20 shows a block diagram of a computer system utilizing the present translator.

Referring now to FIG. 20, a computer system (which may be a computer network) used to implement the present invention is shown. At compile time, the process described grossly by FIG. 5 is implemented. The computer system of FIG. 20 includes one or more Central Processing Units (CPU) 900 for processing all of the respective code as well as computer memory (e.g. RAM memory) 904 which at compile time holds the ASN.1 object definition portion 14 (at least) of the source code which is read off the file system 906 as well as the portion of the MIB Schema Compiler 20 which performs the relational schema generation. Also present is the Relational Database which resides on a disk 910 in the embodiment shown. In general the RDBMS may or may not be present on the same machine on which the MIB Schema Compiler 20 resides. At this time, the source code is pre-processed to produce the relational schema 912 (that is the table definitions, etc.) and methods which can, if desired, be stored in persistent storage (e.g. a relational database resident on a disk drive). It should be noted that this particular hardware arrangement should not be considered limiting since, for example, disk 906 or 910 may be network disks or might be resident on separate disconnected computer systems. Other variations will occur to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the scope of the appended claims.

What is claimed is:

1. A method for a computer to translate an Abstract Syntax Notation object class hierarchy into a relational schema, comprising in combination the steps of:

providing said computer with a computer memory;
   providing in said computer memory a first computer program having at least one Abstract Syntax Notation class hierarchy organization of object-oriented information and being in source code form, said class hierarchy organization comprising at least one parent class of objects having a first attribute and one derived class including at least one of said objects of said parent class, said derived class having a second attribute, said derived class inheriting said first attribute from said parent class;

analyzing said first computer program with a second computer program to locate automatically said class hierarchy organization;

using said second computer program to create automatically from said located class hierarchy organization a first source code routine in said computer memory for defining a first table structure, corresponding to said parent class, including a first table name, said first table structure including:

a first instance identifier field for storing a unique first instance identifier for each particular object instance of one of said objects, and a first attribute field for storing an attribute instance of said first attribute for said each particular object instance, said first instance identifier field and said first attribute field composing a record of said first table structure;

using said second computer program to create automatically from said located class hierarchy organization a second source code routine for defining a second table structure, corresponding to said derived class, including a second table name, said second table structure including:

a second instance identifier field for storing a second instance identifier which identifies said particular object instance of said one of said objects included in said derived class, and a second attribute field for storing an attribute instance of said second attribute for said particular object instance of said one of said objects included in said derived class, said second instance identifier field and said second attribute field composing a record of said second table structure; and referencing said second identifier field to said first identifier field.

2. The method of claim 1, wherein said referencing step comprises placing identical said instance identifiers in said first and second instance identifier fields.

3. The method of claim 2, further comprising a step of using said second computer program to create automatically a third source code routine in said computer memory for joining said record of said first table structure to said record of said second table structure by using said instance identifier in said first and second instance identifier fields to extract said attribute instances of said first and second attribute fields for said particular object instance, whereby said derived class inheriting said first attribute from said parent class of said class hierarchy is preserved in said relational schema.

4. The method of claim 1, further comprising a step of using said second computer program to create automatically a third source code routine in said computer memory for querying said table structures using a "JOIN" operator from SQL to find said instances of said attributes in said records having said first and second instance identifier fields referenced.

5. The method of claim 3, further comprising a step of compiling said first computer program and said third source code routine to create a run-time computer program stored in said computer memory.

6. The method of claim 5, further comprising a step of storing said table structures in a persistent media operatively coupled to said computer.

7. The method of claim 1, further comprising a step of using said second program for generating a source code routine to create a set of dictionary tables which contain information adequate to define the Abstract Syntax Notation object class hierarchy relationship, object instance containment hierarchy and object instance name mapping.

8. The method of claim 1, wherein said steps of using said second computer program to create said source code routines includes creating said source code routines for constructing SQL commands to create said table structures; and further including the steps of providing a relational database management system stored in a persistent memory and sending said SQL commands to said relational database management system to cause said table structures to be generated and stored in said persistent memory.

9. The method of claim 1, further comprising a step of using said second computer program to generate a source code routine for creating a view of said second table structure which includes a join into said first table structure.

10. The method of claim 1, further comprising a step of using said second program to automatically provide additional source code routines for storage, deletion and retrieval of object instances in said table structures.

11. The method of claim 1, further comprising a step of using said second computer program to generate a source code routine for creating indexes on said table structures.

12. The method of claim 1, further comprising a steps of:

ascertaining that one of said attributes is of an ASN.1 MULTI-VALUED type;

defining a third relational table having an third instance identifier field for storing an instance identifier and a third field for storing instances of said MULTI-VALUED attribute; and referencing said third instance identifier field to said first instance identifier field.

13. The method of claim 1, further comprising a steps of:

ascertaining that one of said attributes is of an ASN.1 SET OF type of unspecified size;

defining a third relational table having an third instance identifier field for storing an instance identifier and a third field for storing instance of said SET OF attribute; and referencing said third instance identifier field to said first instance identifier field.

14. The method of claim 1, further comprising a steps of:

ascertaining that one of said attributes is of an ASN.1 SEQUENCE OF type of unspecified size, said SEQUENCE OF type attribute having a collection of ordered components;

defining a third relational table having an third instance identifier field for storing an instance identifier, a third field for storing instances of said SEQUENCE OF attribute and a sequence index field for storing an order of appearance of said components of said SEQUENCE OF attribute; and referencing said third instance identifier field to said first instance identifier field.

15. The method of claim 1, further comprising:

ascertaining that one of said attributes is of an ASN.1 SET type having a predetermined plurality of components;

defining a plurality of columns in said first relational table corresponding with said predetermined plurality of components.

16. The method of claim 1, further comprising:
ascertaining that one of said attributes is of an ASN.1 SET OF type of specified size having a predetermined plurality of components;
defining a plurality of columns in said first relational table corresponding with said predetermined plurality of components.

17. The method of claim 1, further comprising:
ascertaining that one of said attributes is of an ASN.1 SEQUENCE type having a predetermined plurality of components;
defining a plurality of columns in said first relational table corresponding with said predetermined plurality of components.

18. The method of claim 1, further comprising:
ascertaining that one of said attributes is of an ASN.1 SEQUENCE OF type of specified size having a predetermined plurality of components;
defining a plurality of columns in said first relational table corresponding with said predetermined plurality of components.

19. The method of claim 1, further comprising:
ascertaining that one of said attributes is of an ASN.1 CHOICE type having a predetermined plurality of choice components;
defining a plurality of columns in said first relational table corresponding with said predetermined plurality of choice components.

20. The method of claim 1, further comprising a steps of:
ascertaining that one of said parent and derived object classes possesses a CONDITIONAL PACKAGE;
defining a third relational table having an third instance identifier field for storing an instance identifier and a third field for storing instances of said CONDITIONAL PACKAGE; and
referencing said third instance identifier field to said first instance identifier field.

21. The method of claim 20, further comprising:
examining attributes of the CONDITIONAL PACKAGE to ascertain a type associated with each said attribute of said CONDITIONAL PACKAGE, where said type is one of primitive type, SET, SET OF with specified size, SET OF with unspecified size, SEQUENCE, SEQUENCE OF with specified size, SEQUENCE OF with unspecified size, CHOICE, MULTI-VALUED, ATTRIBUTE GROUP and CONDITIONAL PACKAGE;
processing each of said attributes in accordance with said type.

22. The method of claim 1, further comprising:
ascertaining that one of said parent and derived object classes possesses an ATTRIBUTE GROUP;
defining a third relational table having an third instance identifier field for storing an instance identifier and a third field for storing instances of said ATTRIBUTE GROUP; and
referencing said third instance identifier field to said first instance identifier field.

23. The method of claim 22, further comprising:
examining attributes of the ATTRIBUTE GROUP to ascertain a type associated with each said attribute of said ATTRIBUTE GROUP where said type is one of primitive type, SET, SET OF with specified size, SET OF with unspecified size, SEQUENCE, SEQUENCE OF with specified size, SEQUENCE OF with unspecified size, CHOICE, MULTI-VALUED, ATTRIBUTE GROUP and CONDITIONAL PACKAGE;
processing each of said attributes in accordance with said type.

24. The method of claim 1, further comprising:
ascertaining that one of said attributes is of an ASN.1 primitive type;
defining a column in said first relational table corresponding with said primitive type.

25. An apparatus for translating information represented as an Abstract Syntax Notation object-class hierarchy into a relational table schema, comprising in combination:
central processing means;
computer memory means, operatively coupled to said central processing means, for temporary storage of information;
a computer program, stored in said computer memory means in source code form, including at least one Abstract Syntax Notation data organization in the form of said object class hierarchy, said object class hierarchy being for object-oriented data and including at least one parent class of objects having a first attribute and one derived class of at least one of said objects having a second attribute, said derived class inheriting said first attribute from said parent class;
schema compiler means, stored in said computer memory, for locating automatically said object class hierarchy in said computer program and for translating said object class hierarchy into said relational table schema;
said schema compiler means including first table means for defining automatically in said relational table schema a first table structure, corresponding to said parent class, including a first table name, said first table structure including:
a first instance identifier field for storing a first instance identifier which identifies a particular object instance of said one object, and
a first attribute field for storing an attribute instance of said first attribute for said one object,
said first instance identifier field and said first attribute field comprising a record of said first table structure;
said schema compiler means further including second table means for defining automatically in said relational table schema s second table structure, corresponding to said derived class, including a second table name, said second table structure including:
a second instance identifier field for storing a second instance identifier which identifies said particular object instance of said one object,
and a second attribute field for storing an attribute instance of said second attribute for said one object,
said second instance identifier field and said second attribute field comprising a record of said second table structure; and
said schema compiler means further including reference means for said relational table schema to reference said second instance identifier field to said first instance identifier field.

26. The Apparatus of claim 25, wherein said schema compiler means further includes joining means for creating automatically said relational table schema to have means for extracting from said table structures said instances of said first and second attributes for said particular object instance by using said referencing of said second identifier field to said first identifier field, whereby said derived class inheriting said first attribute from said parent class of said class hierarchy is preserved in said relational schema.

27. The apparatus of claim 25, wherein said reference means is adapted for placing identical instance identifier information in said first and second instance identifier fields.

28. The apparatus of claim 27, further comprising means for joining said record of said first table structure to said record of said second table structure by using said instance identifier information in said first and second instance identifier fields to extract said attribute instances from said first and second attribute field for said particular object instance, whereby said derived class inheriting said first attribute from said parent class of said class hierarchy is preserved in relational schema.

29. The apparatus of claim 25, wherein said abstract syntax notation is expressed in ASN.1 notation.

30. The apparatus of claim 25, further comprising means for generating a source code routine for creating a set of dictionary tables which contain information adequate to define the class hierarchy relationship.

31. The apparatus of claim 25, wherein said first and second table means automatically are operable generating source code routines for constructing SQL commands to create said first and second table structures, respectively; and further comprising a relational database management system stored in a persistent memory of said second computer and means for sending said SQL commands to said relational database management system to cause said table structures to be generated and stored in said persistent memory.

32. The apparatus of claim 25, further comprising means for generating a source code routine to create a view of said second table structure which includes a join into said first table structure.

33. The apparatus of claim 25, further comprising means for generating a source code routine to create indexes on said table structure.

34. The apparatus of claim 25, wherein said schema compiler means further includes means for automatically providing additional source code routines for storage, deletion and retrieval of object instances in said table structures.

* * * * *